(12) United States Patent
Muranaka

(10) Patent No.: US 7,167,536 B2
(45) Date of Patent: Jan. 23, 2007

(54) SIGNAL RECEIVING CIRCUIT, SEMICONDUCTOR DEVICE AND SYSTEM

(75) Inventor: Masaya Muranaka, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 878 days.

(21) Appl. No.: 10/152,804

(22) Filed: May 23, 2002

(65) Prior Publication Data

US 2002/0181618 A1    Dec. 5, 2002

(30) Foreign Application Priority Data

May 30, 2001  (JP)  .............................. 2001-162794

(51) Int. Cl.
   *H04L 23/00*    (2006.01)
(52) U.S. Cl. ...................... 375/377; 375/354
(58) Field of Classification Search ................ 375/316, 375/354, 377
   See application file for complete search history.

(56) References Cited

U.S. PATENT DOCUMENTS

| | | | | |
|---|---|---|---|---|
| 4,766,567 A | * | 8/1988 | Kato ............................ | 714/22 |
| 6,392,450 B2 | * | 5/2002 | Yoshida et al. ................ | 327/72 |
| 6,594,769 B2 | * | 7/2003 | Dabral et al. ................ | 713/300 |

FOREIGN PATENT DOCUMENTS

JP          6-37854          7/1992

(Continued)

OTHER PUBLICATIONS

Shigehiro Kuge, Tetsuo Kato, Kiyohiro Furutani, Shigeru Kikuda, Katsuyosi Mitsui, Takeshi Hamamoto, Jun Setogawa, Kei Hamade, Yuichiro Komiya, Satoshi Kawaski, Takashi Kono, Teruhiko Amano, Takashi Kubo, Masaru Haraguchi, Zenya Kawaguchi, Yoshito Nakaoka, Mihoko Akiyama, Yasuhiro Konishi, Hideyuki Ozaki, "A 0.18μm 256Mb DDR-SDRAM with Low-Cost Post Mold-Tuning Method for DLL Replica", ISSCC 2000/Sssion 24/DRAM/Paper WP 24.6.

(Continued)

Primary Examiner—Dac V. Ha
(74) Attorney, Agent, or Firm—Reed Smith LLP; Stanley P. Fisher, Esq.; Juan Carlos A. Marquez, Esq.

(57) ABSTRACT

This invention provides a signal transfer technique capable of realizing stable high rate data transfer and the reduction of a layout area. A system (semiconductor device) for realizing a high rate data transfer circuit method includes: a transmission circuit which consists of a normal signal transmitter and a receiving amplifier starting signal transmitter; a receiving circuit which consists of a receiving amplifier and a receiving amplifier starting signal receiver; a normal signal line and a receiving amplifier starting signal line connected between the transmission circuit and the receiving circuit; and the like. The normal signal transmitter includes a circuit which changes an output level for a specific period in accordance with the level of a normal signal and a circuit which controls the normal signal line to allow the normal signal line to function between VDD and VSS. The receiving amplifier includes a capacitance and a circuit which fetches a voltage of the capacitance at predetermined change timing of a control signal and then outputs a signal based on the fetched voltage of the capacitance. The receiving amplifier consists of a chopper comparator, and the normal signal line consists of a single transmission path.

23 Claims, 30 Drawing Sheets

FOREIGN PATENT DOCUMENTS

| | | |
|---|---|---|
| JP | 6-37857 | 7/1992 |
| JP | 6-78003 | 8/1992 |
| JP | 7-44473 | 7/1993 |
| JP | 7-46135 | 8/1993 |
| JP | 7-95249 | 9/1993 |
| JP | 9-321810 | 5/1996 |
| JP | 10-303994 | 4/1997 |
| JP | 10-327202 | 7/1997 |
| JP | 2000-49575 | 7/1998 |
| JP | 2000-244586 | 3/1999 |

OTHER PUBLICATIONS

Hideo Mukai, Takeshi Nagai, Satoru Takase, Seiro Imai, Hiroshi Maejima, Mikihiko Ito, Teshiteru Yamamoto, Hiroko Waki, Kiyofumi Sakurai, Takaniko Hara, Masaru Koyanagi, Kaoru Nakagawa, "New Architecture for Cost-Efficient High-Performance Multiple-Bank RDRAM", 2000 IEEE International Solid State Circuits Conference, pp. 400-401.

* cited by examiner

SIGNAL RECEIVING CIRCUIT, SEMICONDUCTOR DEVICE AND SYSTEM

BACKGROUND OF THE INVENTION

1. Field of the Invention

The present invention relates to a signal transfer technique and particularly relates to a technique effective to be applied to a high rate data transfer circuit method.

2. Description of the Related Art

According to the study of the inventor of the present invention, signal transfer related techniques are exemplified by those described in Japanese Patent Application Laid-Open Nos. 6-78003, 2000-244586, 7-44473, 2000-49575, and 10-327202 and that described in ISSCC 2000/SESSION 24/DRAM/PAPER WP 24.6.

Japanese Patent Application Laid-Open No. 6-78003 discloses a technique for providing a high rate data transfer method capable of transferring a large volume of data at one clock by converting digital data to analog data, i.e., to voltage data and then transmitting the converted voltage data.

Japanese Patent Application Laid-Open No. 2000-244586 discloses a data transmission system including a transmitter 100 for transmitting information to be transmitted and a reference signal referred to so as to demodulate the information, and a receiver 200 for receiving the information and the reference signal, in which the reference signal is subjected to channel- or time-division multiplexing and then transmitted.

Japanese Patent Application Laid-Open No. 7-44473 discloses a technique as follows. On a transmission side, each output driving circuit drives a corresponding signal line in accordance with an inputted signal, and a reference voltage generation circuit generates a reference voltage having a predetermined voltage relationship with a signal voltage from each output driving circuit and outputs the generated reference voltage to one signal line. On a receiving side, each voltage comparator compares the reference voltage from the one signal line with the signal voltage from the signal line connected to the corresponding output driving circuit, whereby the signal inputted into the corresponding output driving circuit is reproduced.

Japanese Patent Application Laid-Open No. 2000-49575 discloses an interface circuit including a clock wiring 101 for transmitting a clock signal from a master 10 to a slave 20, and a data wiring 102 for transmitting a data signal, in which the slave includes an averaging circuit 21 for generating an average voltage value Vref from an internal clock, and an input buffer 22 for comparing the inputted data signal propagated from the data wiring 102 with the average voltage value Vref and then outputting internal data 24.

Japanese Patent Application Laid-Open No. 10-327202 discloses a technique including a digital input terminal for individually inputting a data signal and a clock signal outputted in parallel from a digital output terminal of a digital broadcasting receiver, an averaging circuit for outputting a signal of a level obtained by averaging said inputted clock signal, and a first comparator for comparing the level of the inputted data signal with the output of this averaging circuit as a reference level, in which a data signal subjected to waveform shaping is fetched from this first comparator.

ISSCC 2000/SESSION 24/DRAM/PAPER WP 24.6 discloses a technique in which a capacitance is provided on data lines DataBus/DataBus# and the pair lines of a data line DataBus and a data line DataBus# are used as the data lines.

SUMMARY OF THE INVENTION

Meanwhile, after the inventor of the present invention studied the techniques described in Japanese Patent Application Laid-Open Nos. 6-78003, 2000-244586, 7-44473, 2000-49575 and 10-327202 and that described in ISSCC 2000/SESSION 24/DRAM/PAPER WP 24.6, the following matters have become clear. None of these techniques are intended to extract the direction of the voltage change of a transmission signal in accordance with a timing signal.

In addition, according to a small-amplitude data transfer method employing complementary signal lines (pair lines), "signal driving"→"equalization" are carried out for each data transfer. The amount of effective signals on the complementary lines so as to transfer data is several hundreds mV. The improved function of a DRAM causes the requirements for the small-amplitude data transfer. For example, the additional (load) capacitance of a data bus increases due to the bonding option of an input/output I/O width (x1, x4, x8, x16) or an operation mode (SD, DDR), the mounting of a DFT function and the like, resulting in the increase of the data transfer delay. In addition, the increase in the size of a data transmitting driver to recover the delay itself causes a side effect of the increase of the load capacitance, with the result that the delay cannot be decreased.

Further, in a small-amplitude data transfer method using ordinary complementary signals, the equalization of complementary lines is executed for each data transfer as stated above. According to this method, amplitude is small, the equalization between the first and second data transfers is eliminated, and the signal in the second data transfer is added to that in the first data transfer. On a data receiving side, series capacitors separate the amplitude of each signal and two amplifiers corresponding to the first transfer data and second transfer data fetch the data, respectively. It is noted that it is necessary to execute equalization between the second and third data transfer. The data transfer rate efficiency of this method is expressed by three steps of "signal driving"→"signal driving"→"equalization" as compared with a normal case requiring four steps of "signal driving"→"equalization"→"signal driving"→"equalization". In this way, the data transfer rate is accelerated 4/3 times faster than that in an ordinary data transfer.

Typical disadvantages of the above-stated small-amplitude data transfer are as follows.

(1) Because of the use of complementary lines, the number of signal lines is doubled and layout area is increased in general.

(2) While a data receiving side requires an amplifier for amplifying a small-amplitude signal and a signal for starting the amplifier, it becomes more difficult to control the timings of the signals as data transfer rate becomes faster.

(3) In some data bus methods, the positions of a data sender (transmission side) and a data recipient (receiving side) are not fixed. In this case, it becomes far more difficult to ensure the optimum timing control over the changing positional relationship of (2) mentioned above.

It is, therefore, an object of the present invention to provide a signal transfer technique capable of realizing stable, high rate data transfer while paying attention to the disadvantages of (2) and (3) mentioned above.

Also, another object of the present invention is to provide a signal transfer technique capable of realizing the reduction of the layout area while paying attention to the disadvantage of (1) mentioned above.

The above and other objects and novel features of the present invention will be readily apparent from the descriptions of this specification and the accompanying drawings.

Among the inventions disclosed in this application, typical inventions will be outlined as follows.

To attain the above objects, the present invention adopts the methods as follows: (1) to increase the transfer rate of a signal line having a large load capacitance such as a data bus, (2) to suppress the increase of the layout area by using one signal line instead of complementary lines, (3) to employ a driver using three levels as a signal transmitter on a data transmission side and to employ a chopper comparator as a receiving amplifier on a data receiving side, (4) to transmit a receiver starting signal from the transmission side to a receiver using a dedicated line simultaneously with the transmission of data, and thereby matching data transmission and receiving timings, and the like.

Namely, a signal receiving circuit according to the present invention includes a circuit for extracting a direction of a voltage change of a transmission signal in accordance with a timing signal. In addition, the signal receiving circuit is included in a semiconductor chip, and the semiconductor chip further includes a signal transmission circuit for outputting the transmission signal and a signal line for transmitting the transmission signal. Also, the signal receiving circuit is included in a semiconductor chip, and the transmission signal is applied from an outside of the semiconductor chip.

Further, a semiconductor device according to the present invention includes a circuit for extracting a direction of a voltage change of a transmission signal transmitted through a single transmission path in accordance with a timing signal.

A system according to the present invention includes: a first circuit including a first terminal for outputting data and a second terminal for outputting a timing signal; a second circuit including a third terminal connected to the first terminal, a fourth terminal connected to the second terminal, and a receiving circuit connected to the third terminal and the fourth terminal; a first wiring connected between the first terminal and the third terminal; and a second wiring connected between the second terminal and the fourth terminal, wherein the receiving circuit includes: a capacitance having a first electrode and a second electrode connected to the third terminal; and a circuit for fetching a voltage of the second electrode at predetermined change timing of the timing signal. In addition, the first circuit is included in a first semiconductor chip, and the second circuit is included in a second semiconductor chip; or the first circuit and the second circuit are included in the same semiconductor chip. Further, the first wiring is a single transmission path. Also, the first circuit includes: a circuit for changing an output level for a specific period in accordance with a level of the data; and a circuit for controlling the first wiring to allow the first wiring to function between a first potential and a second potential. Further, the receiving circuit is a chopper comparator. In addition, a plurality of the first wirings are provided, and the second wiring is a single wiring common to the plurality of first wirings.

Moreover, another system according to the present invention includes: a transmission circuit including a first terminal for outputting data and a second terminal for outputting a control signal; a third terminal connected to the first terminal and a fourth terminal connected to the second terminal; a receiving circuit connected to the third terminal and the fourth terminal; a first wiring connected between the first terminal and the third terminal; and a second wiring connected between the second terminal and the fourth terminal, wherein the receiving circuit includes: a capacitance having a first electrode and a second electrode connected to the third terminal; and a circuit for outputting a signal based on a voltage of the second electrode at predetermined timing of the control signal. In addition, the transmission circuit is included in a first semiconductor chip, and the receiving circuit is included in a second semiconductor chip; or the transmission circuit and the receiving circuit are included in the same semiconductor chip. Further, the first wiring is a single transmission path. Further, the transmission circuit includes: a circuit for changing an output level for a specific period in accordance with a level of the data; and a circuit for controlling the first wiring to allow the first wiring to function between a first potential and a second potential. In addition, the receiving circuit is a chopper comparator. Besides, a plurality of the first wirings are provided, and the second wiring is a single wiring common to the plurality of first wirings.

Furthermore, another semiconductor device according to the present invention includes: a transmission circuit including a first terminal for outputting data and a second terminal for outputting a control signal; a third terminal connected to the first terminal and a fourth terminal connected to the second terminal; a receiving circuit connected to the third terminal and the fourth terminal; a first wiring connected between the first terminal and the third terminal; and a second wiring connected between the second terminal and the fourth terminal, wherein the receiving circuit includes: a capacitance having a first electrode and a second electrode connected to the third terminal; and a circuit for outputting a signal based on a voltage of the second electrode at predetermined timing of the control signal. In addition, the first wiring is a single transmission path. Further, the transmission circuit includes: a circuit for changing an output level for a specific period in accordance with a level of the data; and a circuit for controlling the first wiring to allow the first wiring to function between a first potential and a second potential. Further, the receiving circuit is a chopper comparator. Besides, a plurality of the first wirings are provided, and the second wiring is a single wiring common to the plurality of first wirings.

DESCRIPTION OF THE PREFERRED EMBODIMENTS

The embodiments of the present invention will be described hereinafter in detail with reference to the drawings. In the entire drawings for describing the embodiments, the same constituent elements are denoted by the same reference symbols, respectively and repetitive description-thereof will be omitted.

Figure 1:
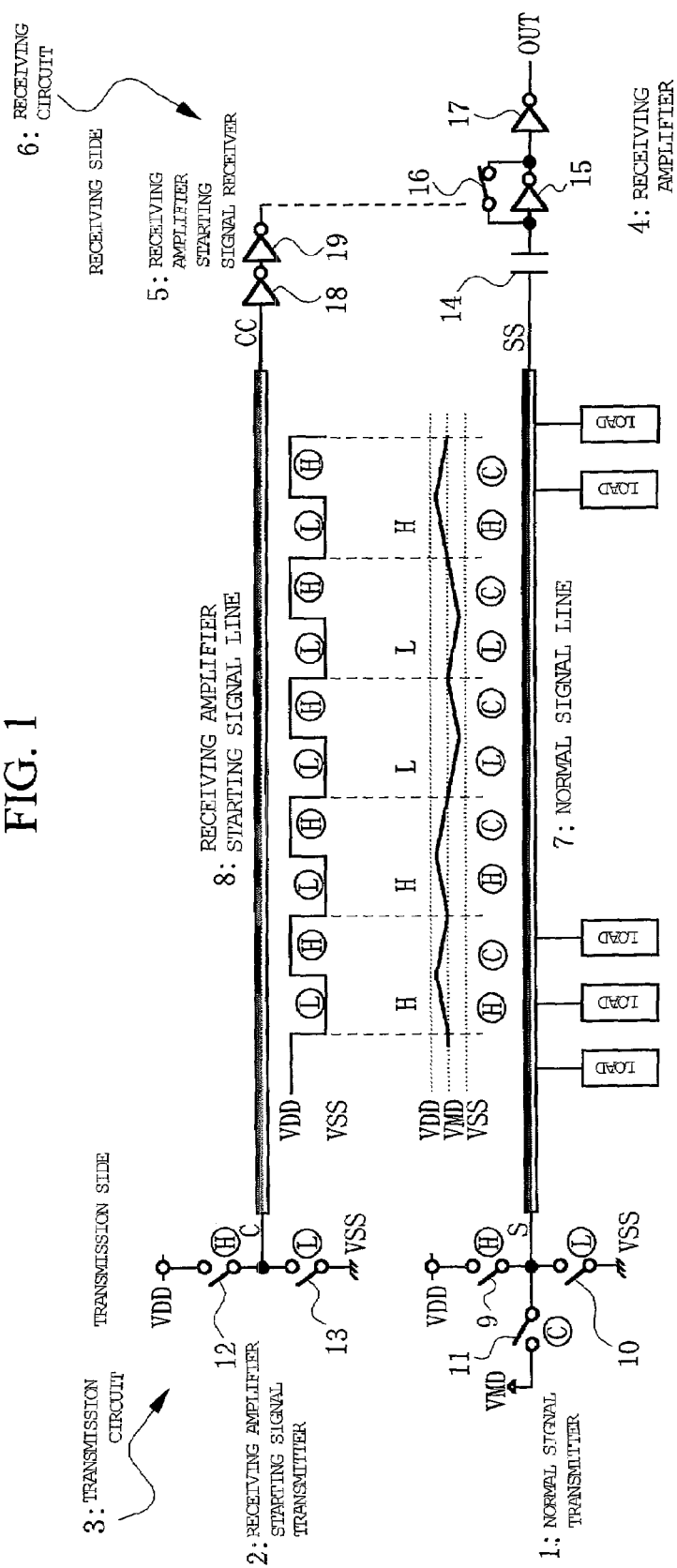
FIG. 1 is a schematic diagram showing a system for realizing the high rate data transfer circuit method of the present invention.

Referring to FIG. 1, the schematic of one example of a system for realizing the high rate data transfer circuit method of the present invention will be described. FIG. 1 is a schematic diagram showing the system for realizing the high rate data transfer circuit method of the present invention.

The system for realizing the high rate data transfer circuit method of the present invention includes: a transmission circuit 3 which consists of a normal signal transmitter 1 including a first terminal which outputs data and a receiving amplifier starting signal transmitter 2 including a second terminal which outputs a control signal; a receiving circuit 6 which consists of a receiving amplifier 4 including a third terminal connected the first terminal of the transmission circuit 3 and a receiving amplifier starting signal receiver 5 including a fourth terminal connected to the second terminal; a normal signal line 7 serving as a first wiring connected between the first terminal of the transmission circuit 3 and the third terminal of the receiving circuit 6; a receiving amplifier starting signal line 8 serving as a second wiring connected between the second terminal of the transmission circuit 3 and the fourth terminal of the receiving circuit 6; and the like.

The normal signal transmitter 1 of the transmission circuit 3 includes: a circuit which changes an output level for a specific period according to the level of a normal signal; and a circuit which controls the normal signal line 7 to function between a first potential and a second potential. In FIG. 1, the normal signal transmitter 1 is expressed by a switch 9 which connects/disconnects the normal signal line 7 to/from a power supply potential VDD, a switch 10 which connects/ disconnects the normal signal line 7 to/from a ground potential VSS, and a switch 11 which connects/disconnects the normal signal line 7 to/from an intermediate potential VMD (e.g., VMD=VDD/2) between the power supply potential VDD and the ground potential VSS. The normal signal transmitter 1 has, therefore, a functional structure which can be respectively expressed by these switches 9, 10, and 11. Likewise, the receiving amplifier starting signal transmitter 2 is expressed by a switch 12 which connects/disconnects the receiving amplifier starting signal line 8 to/from the power supply potential VDD and a switch 13 which connects/disconnects the receiving amplifier starting signal line 8 to/from the ground potential VSS. The receiving amplifier starting signal transmitter 2 has, therefore, a functional structure which can be respectively expressed by these switches 12 and 13.

The receiving amplifier 4 of the receiving circuit 6 includes a capacitance which has a first electrode and a second electrode, and a circuit which fetches the voltage of the second electrode of the capacitance at the predetermined change timing of the control signal and outputs a signal based on this voltage fetched. The receiving amplifier 4 consists of a chopper capacitor. In FIG. 1, the receiving amplifier 4 is expressed by a capacitor 14 the first electrode of which is connected to the normal signal line 7, an inverter 15 which serves as an inversion amplifier connected to the second electrode of the capacitor 14, a switch 16 which connects/disconnects the input and output of the inverter 15 to/from each other, and an inverter 17 connected to the inverter 15. The receiving amplifier 4 has, therefore, a functional structure which can be respectively expressed by these constituent elements. Also, the receiving amplifier starting signal receiver 5 is expressed by two inverters 18 and 19 connected in series, which serve as inversion amplifiers. The receiving amplifier starting signal receiver 5 has, therefore, a functional structure which can be respectively expressed by these constituent elements.

The normal signal line 7 consists of a single transmission path such as a data bus having a high wiring load capacitance. The receiving amplifier starting signal line 8 is a control line which does not have such a load as that of the normal signal line 7 and has only a resistance and a capacitance of the wiring itself.

The transmission circuit 3 on a transmission side outputs data from the normal signal transmitter 1 and, at the same time, drives the receiving amplifier starting signal line 8 to low level by means of the receiving amplifier starting signal transmitter 2. In addition, the normal signal line 7 normally has the intermediate potential VMD between the power supply potential VDD and the ground potential VSS. However, if transfer data is at high level, the normal signal line 7 is driven to have the power supply potential VDD during the period when the receiving amplifier starting signal line 8 is at low level. If the transfer data is at low level, the normal signal line 7 is driven to have the ground potential VSS during the period when the receiving amplifier starting signal line 8 is at low level. In the example of FIG. 1, there is shown a case when the data level is changed in the order of high (H)→high (H)→low (L)→low (L)→high (H). In this case, the normal signal transmitter 1 is controlled in the order of VDD (H)/VMD (C)→VDD (H)/VMD (C)→VSS (L)/VMD (C)→VSS (L)/(VMD) (C)→VDD (H)/VMD (C). In addition, the receiving amplifier starting signal controlled by the receiving amplifier starting signal transmitter 2 repeats VSS (L)/VDD (H). If a data transfer cycle is short, the normal signal line 7 which has a high load capacitance turns into a state in which the signal does not completely oscillate to VDD or VSS. This phenomenon becomes more conspicuous at the farther point of the wiring.

The signal of the normal signal line 7 is received by the receiving amplifier 4 which consists of the chopper capacitor in the receiving circuit 6 on a receiving side. If the signal of the receiving amplifier starting signal line 8 received by the receiving amplifier starting signal receiver 5 is at high level, the receiving amplifier 4 causes a short-circuit between the input and the output of the inverter 15 through the switch 16 and sets the signal potential to be close to a so-called logical threshold. When the signal of the receiving amplifier starting signal line 8 is changed to low level, the switch 16 is opened. At this moment, if the voltage level of the normal signal line 7 rises, the output of the inverter 15 has great change to low level. If the voltage level falls, the output of the inverter 15 has great change to high level. In other words, this system employs a method of detecting the amplitude direction of the normal signal of the normal signal line 7 transmitted from the normal signal transmitter 1 at the timing of the receiving amplifier starting signal of the receiving amplifier starting signal line 8 using the receiving amplifier 4 which consists of the chopper comparator.

Figure 2:
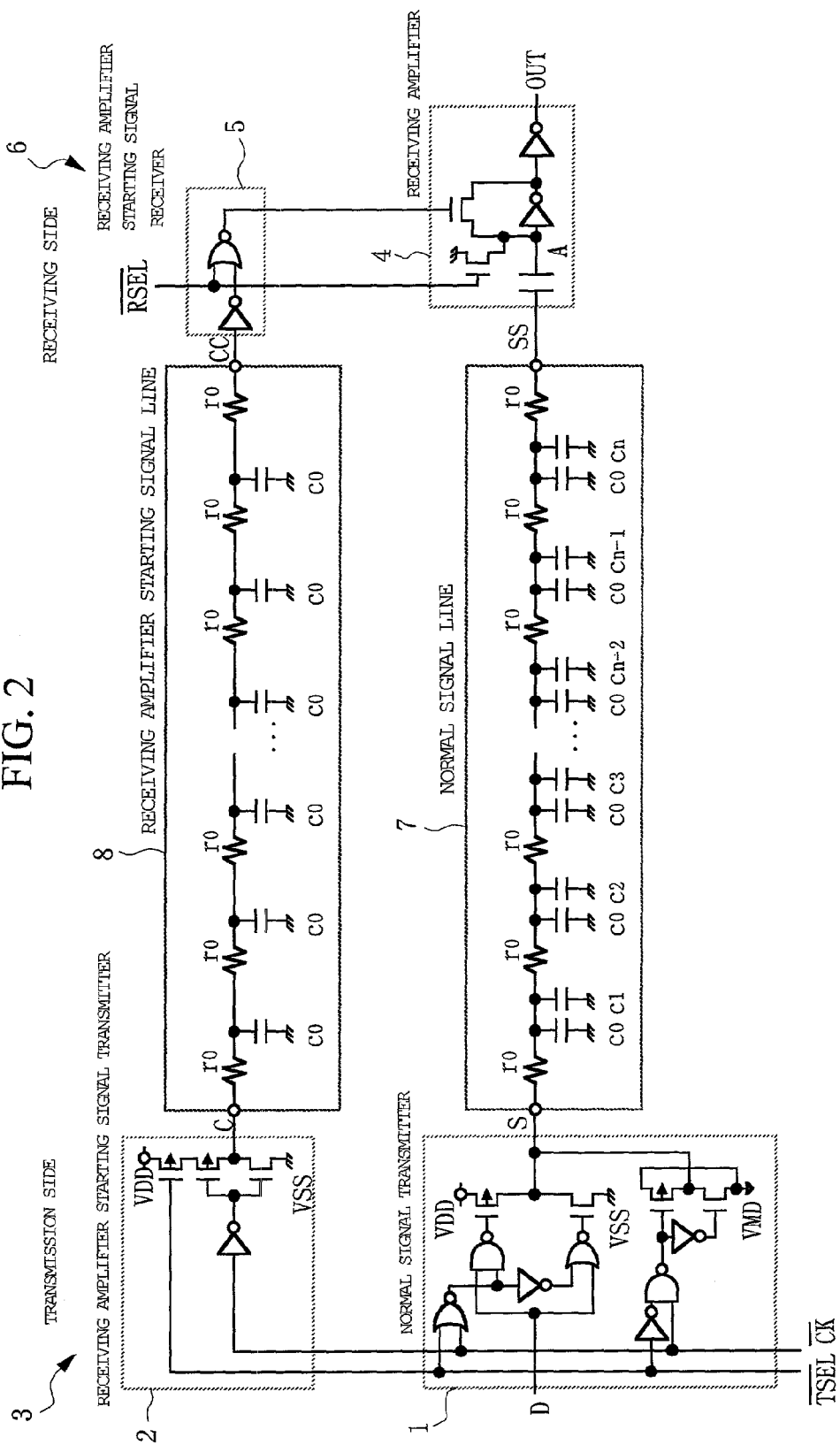
FIG. 2 is a schematic diagram showing a semiconductor device for realizing the high rate data transfer circuit method of the present invention.

Referring to FIG. 2, the schematic of one example of a semiconductor device for realizing the high rate data transfer circuit method of the present invention will be described. FIG. 2 is a schematic diagram showing the semiconductor device for realizing the high rate data transfer circuit method of the present invention.

As in the case of the system shown in FIG. 1, the semiconductor device for realizing the high rate data transfer circuit method of the present invention includes: a transmission circuit 3 which consists of a normal signal transmitter 1 and a receiving amplifier starting signal transmitter 2; a receiving circuit 6 which consists of a receiving amplifier 4 and a receiving amplifier starting signal receiver 5; a normal signal line 7 and a receiving amplifier starting signal line 8 which are connected between the transmission circuit 3 and the receiving circuit 6; and the like. It is noted that each of the normal signal transmitter 1, the receiving amplifier starting signal transmitter 2, the receiving amplifier 4, and the receiving amplifier starting signal receiver 5 serving as the constituent elements of the semiconductor device has terminals (not shown) for connecting to other circuits or external sections and the configuration of each circuit is almost equal to that of a circuit to be described later. Therefore, these circuits will not be described herein. Further, though the following description will be given mainly to a case where the present invention is applied to the semiconductor device, the same technique can be also applied to the system shown in FIG. 1.

The receiving amplifier starting signal line 8 shown in FIG. 2 is the one representing the electrical properties of a metal wiring in the signal wiring region of the semiconductor device such as a DRAM using a resistance (R) and a capacitance (C). In FIG. 2, symbols r0 and c0 denote a resistance value and a capacitance value per unit length of the metal wiring, respectively. To be strict, since the capacitance c0 changes depending on the pattern of a layer adjacent to the metal wiring or that of other dielectric layer or insulating layer provided above or below the metal wiring, the capacitance c0 is not fixed over the entire length of the metal wiring. However, since such a change causes little influence on the object of the present invention, the capacitance is simplified as described above.

The normal signal line 7 indicates a so-called signal bus line. Since one signal line is used for multiple purposes, the capacitance components of the transmission circuit 3 and the receiving circuit 6 connected to the bus line (normal signal line 7) and the parasitic capacitances of lead-in/lead-out lines orthogonal to the normal signal line 7 are added. These added capacitances are denoted by c1 to cn, respectively. Although the capacitance c0 of the normal signal bus line is constant, the capacitances c1 to cn change depending on locations, and capacitance components (c0+c1) to (c0+cn) are distributed. Although differing according to actually used semiconductor devices, the capacitances c1 to cn used herein are assumed to be from several to ten times as high as the capacitance c0.

TSEL/ (bar: indicating an inverted signal, and this applies also to the following) in FIG. 2 is a signal for turning the normal signal transmitter 1 and the receiving amplifier starting signal transmitter 2 into a transmittable state. In this example, it is assumed that a plurality of normal signal transmitters 1 and a plurality of receiving amplifier starting signal transmitters 2 are connected to the normal signal line 7 and the receiving amplifier starting signal line 8, respectively. Therefore, there are a plurality of TSEL/ signals the number of which corresponds to the number of transmitters. If TSEL/ is at high level, the normal signal transmitter 1 for the normal signal line 7 and the receiving amplifier starting signal transmitter 2 for the starting amplifier starting signal line 8 are not at all driven. However, if none of the signals TSEL/ of a plurality of transmitters 1 and 2 are activated, the normal signal line 7 and the receiving amplifier starting signal line 8 turn into a floating state. A means for preventing the floating state will be described later. CK/ is a data transfer timing clock. When TSEL/ is at low level and CK/ is at high level, the receiving amplifier starting signal line 8 is driven to high level and the normal signal line 7 is driven to the intermediate potential VMD between the power supply potential VDD and the ground potential VSS. When TSEL/ is at low level but CK/ changes to low level, the receiving amplifier starting signal line 8 is driven to low level. In addition, when data D is at high level, the normal signal line 7 is driven to VDD. When data D is at low level, the normal signal line 7 is driven to VSS. When CK/ changes again to high level, the receiving amplifier starting signal line 8 is driven to high level and the normal signal line 7 is driven to the intermediate potential VMD between the power supply potential VDD and the ground potential VSS. As can be seen, the transmitter side transmits the receiving amplifier starting signal and the data in accordance with the transition of the data transfer timing clock CK/.

The receiving amplifier starting signal line 8 and the normal signal line 7 differs in signal amplitude velocity due to the difference of load capacitance. It is obvious from a time constant τ expressed by the product of a resistance value and a capacitance value that the signal amplitude velocity of the normal signal line 7 is lower than that of the receiving amplifier starting signal line 8 by as much as a load capacitance ratio. However, it can be said that if the capability of a driving element is ignored, the receiving amplifier starting signal line 8 has sharpest waveform characteristic and fastest signal propagation characteristic in this system because it mainly consists of the resistance component and the capacitance component. From the viewpoint of the receiving amplifier starting signal receiver 5 side, the voltage change of the normal signal line 7 is smaller than that of the receiving amplifier starting signal line 8 during the period of time when the level transition of the receiving amplifier starting signal to low level is recognizable. However, except the small voltage change, the phenomenon of the transition itself is propagated to the receiving side in the same time as that of the receiving amplifier starting signal. Further, by detecting this transition on the receiving side, it is possible to transfer data over the normal signal line 7 having a high load capacitance at the same rate as that of the receiving amplifier starting signal line 8 having the fastest signal propagation characteristic. It is noted that RSEL/ shown in FIG. 2 is a signal for turning the receiving amplifier starting signal receiver 5 and the receiving amplifier 4 into a receivable state.

Figure 3:
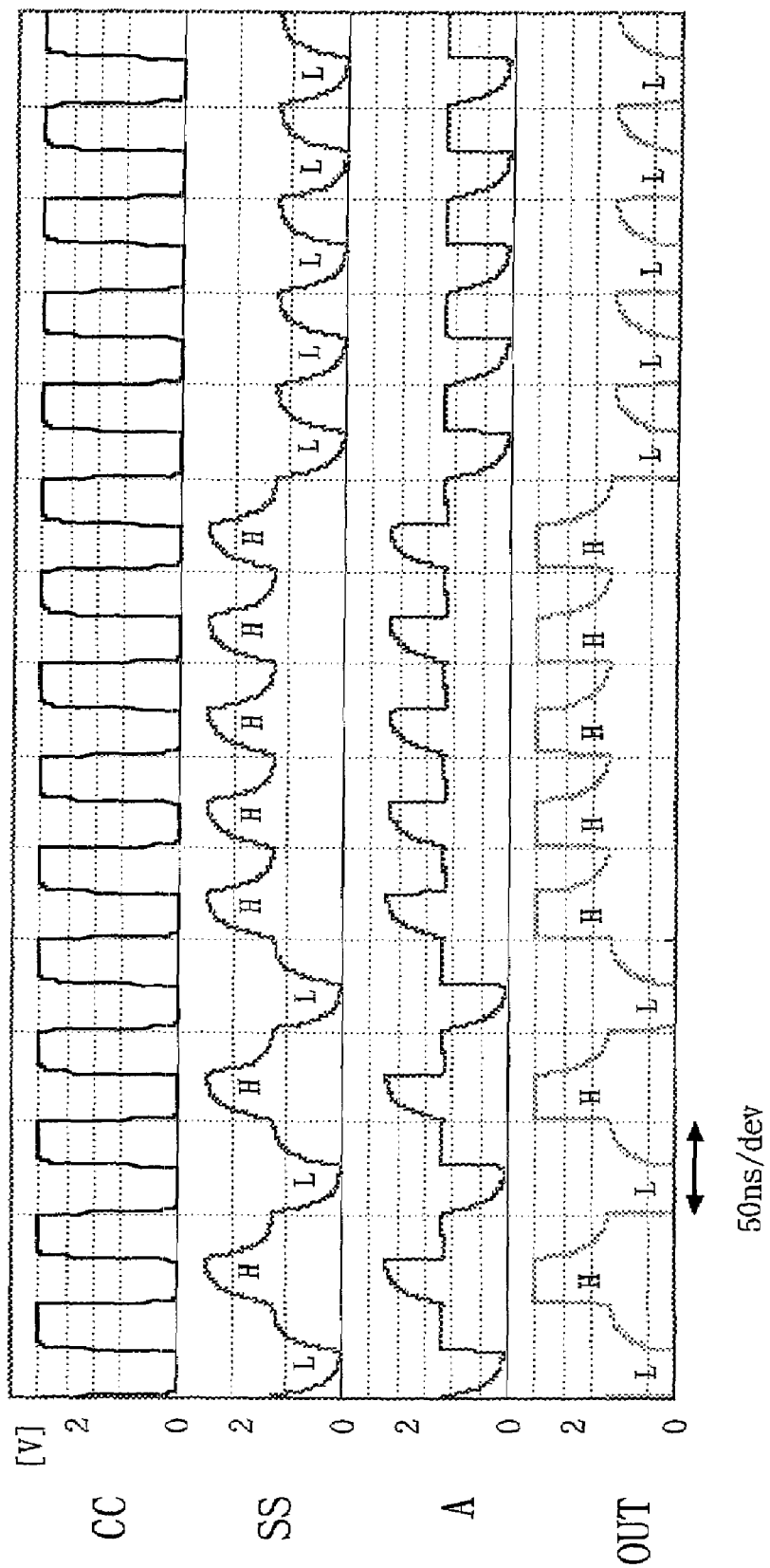
FIG. 3 is a waveform chart showing the operation of the semiconductor device for realizing the high rate data transfer circuit method of the present invention.
Figure 4:
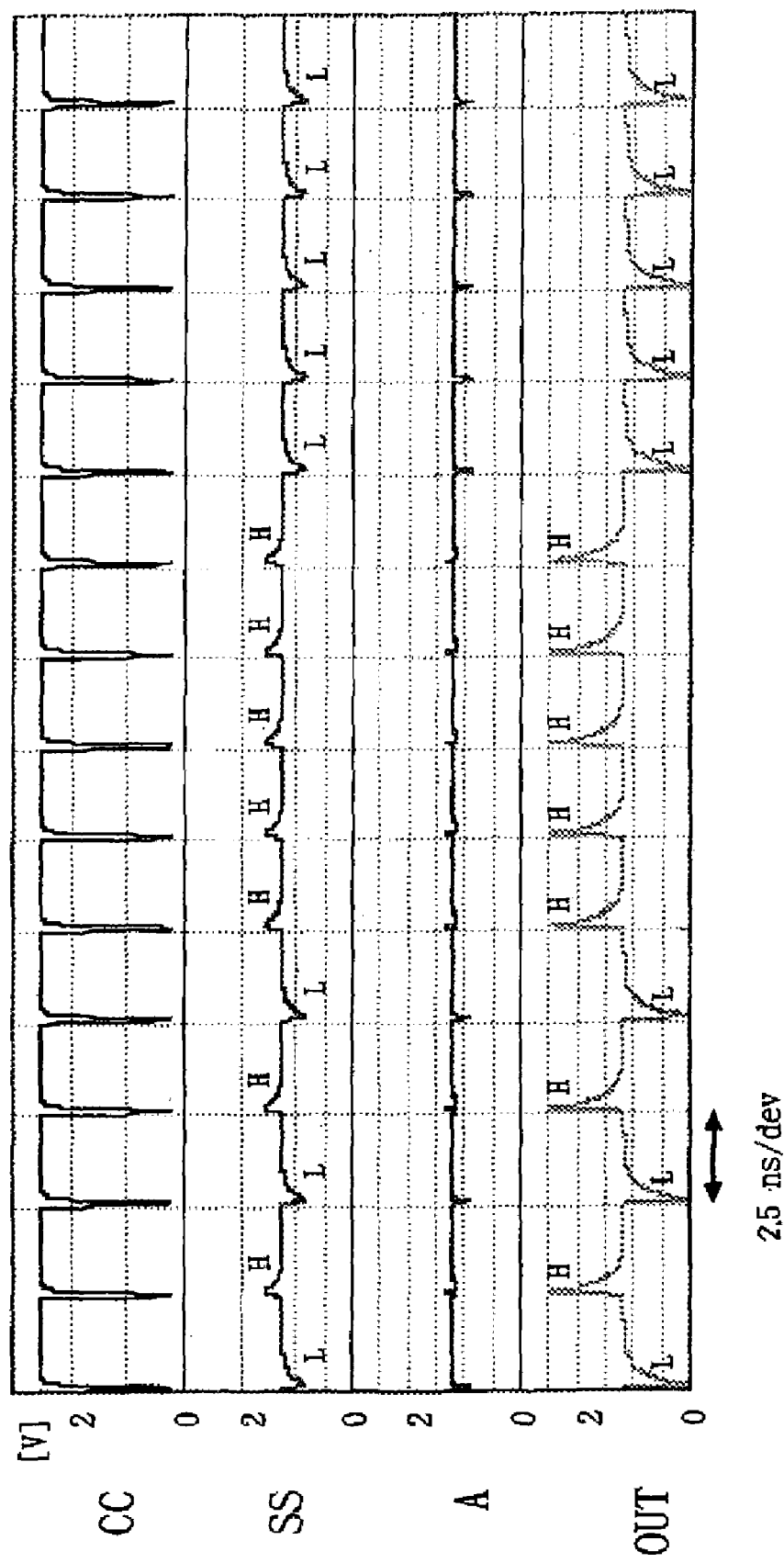
FIG. 4 is a waveform chart showing another operation of the semiconductor device for realizing the high rate data transfer circuit method of the present invention.
Figure 5:
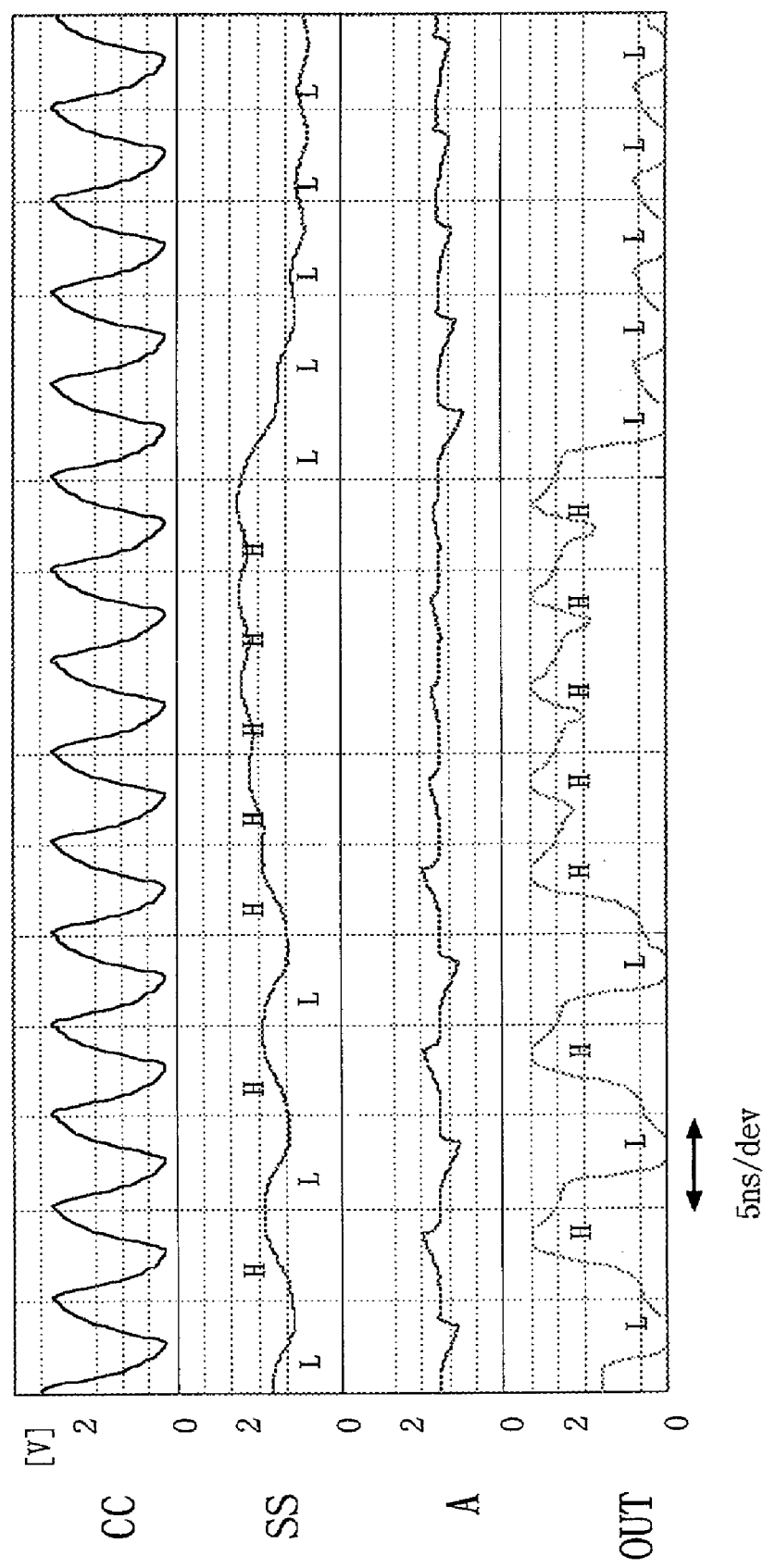
FIG. 5 is a waveform chart showing yet another operation of the semiconductor device for realizing the high rate data transfer circuit method of the present invention.

Referring to FIGS. 3 to 5, the operation of one example of the semiconductor device for realizing the high rate data transfer circuit method of the present invention shown in FIG. 2 will be described. FIGS. 3 to 5 are waveform charts showing the operation of the semiconductor device for realizing the high rate data transfer circuit method of the present invention.

In FIG. 3, it is assumed that a metal wiring having an ordinary length of 10 mm is used. In addition, the total resistance and the total capacitance of the receiving amplifier starting signal line 8 are 1 kΩ and 1 pF, respectively. Those of the normal signal line 7 are 1 kΩ and 10 pF, respectively. If they are compared by the simple time constants τ thereof, the normal signal line 7 is about 10 times as fast as the receiving amplifier starting signal line 8. The cycle of CK/ is 50 ns. This corresponds to a frequency of 20 MHz. The ratio of high level time to low level time is 50%. The power supply potential VDD is 2.5V and the intermediate potential VMD is 1.25V. The signal waveform (CC) of the receiving amplifier starting signal line 8 having a low load capacitance is sharp. The signal waveform (SS) of the normal signal line 7 having a high load capacitance is gentle. Time required to change VMD to VDD or VSS is about 25 ns. The level of the transfer data transmitted by the normal signal line 7 changes in the order of L→H→L→H→L→H→H→H→H→H→L→L→L→L→L. The transfer data is differentiated with respect to the capacitance component of the receiving amplifier 4 there by obtaining a signal waveform (A), which is outputted as a signal waveform (OUT).

In FIG. 4, the low level time of CK/ is set at 2.5 ns compared with that in FIG. 3. The amplitude of the signal waveform (SS) of the normal transmission line 7 is lower than that shown in FIG. 3. However, as is evident from a differential waveform (A) and an out put waveform (OUT), the receiving amplifier 4 surely catches the signal transition.

In FIG. 5, the cycle of CK/ is set at 5 ns. This corresponds to a frequency of 200 MHz. The ratio of high level time to low level time is 50%. This states shows a minimum cycle in which the starting signal can be propagated through the receiving amplifier starting signal line 8. If transfer data is outputted at low level and high level repeatedly, the signal waveform (SS) of the normal signal line 7 oscillates around the VMD level at the center. If the transfer data is outputted at high level, the signal waveform becomes stationary at the intermediate potential between VMD and VDD. If the transfer data is outputted at low level, the signal waveform becomes stationary at the intermediate potential between VMD and VSS. In any cases, the repeatability of the potential change of the normal signal line 7 corresponding to the change of the transfer data, i.e., the potential change of the rise and fall on the far edge of the normal signal line 7 is maintained as is obvious from the differential waveform (A) and the output waveform (OUT). It is noted that the timing of a receiving amplifier starting signal formed on the far edge CC of the receiving amplifier starting signal line 8 can be adjusted by several stages of logic circuits if necessary.

Figure 6:
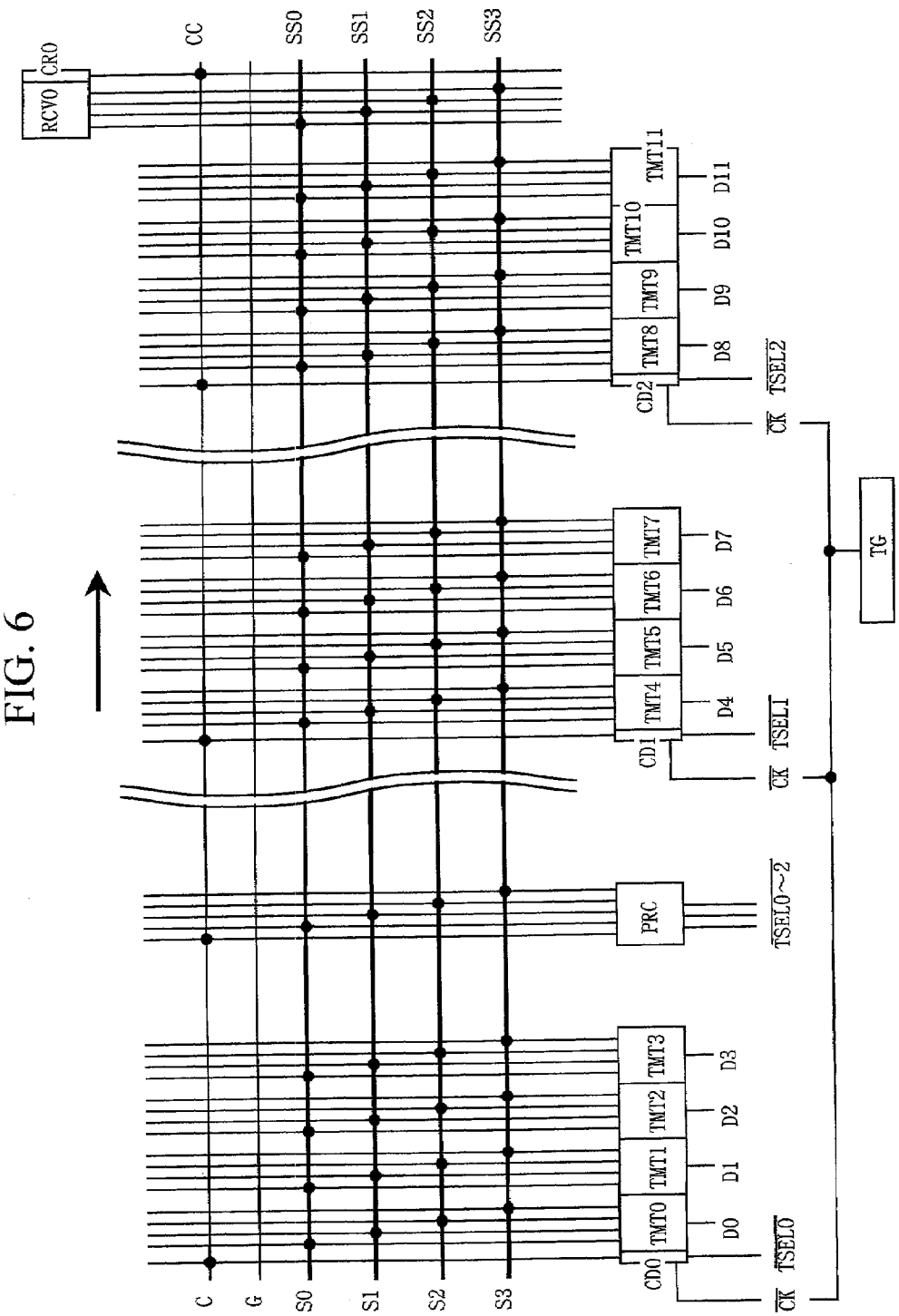
FIG. 6 is a block diagram showing the configuration of a semiconductor device in one embodiment according to the present invention.

Referring to FIG. 6, one example of the configuration of the semiconductor device in one embodiment of the present invention will be described. FIG. 6 is a block diagram showing the configuration of the semiconductor device in one embodiment of the present invention.

FIG. 6 shows one example in which the semiconductor device includes four signal buses (S0-SS0, S1-SS1, S2-SS2, and S3-SS3) as the normal signal lines 7, twelve normal data transmitters TMT0 to TMT11, and one receiving amplifier RCV0 provided on a right end and in which data is transferred from left to right. TG denotes a so-called timing generator, i.e., a circuit which generates a main signal (CK/) for data transfer. The location of the TG in a chip depends on the type of the semiconductor device. In the example of FIG. 6, the TG is arranged at a relatively right-side position of the chip. The signal CK/ supplied by the TG has a delay. For example, if data is transferred from the normal data transmitter TMT0 on the left end to the receiving amplifier RCV0 on the right end and the data transmission timing of the normal data transmitter TMT0 and the receiving amplifier starting timing of the receiving amplifier RCV0 are set directly from the clock signal CK/, then the receiving amplifier starting timing is faster than the data transmission timing. If timing is too fast, there is a probability of data transfer error. It is, therefore, necessary that the receiving amplifier starting timing of the receiving amplifier RCV0 is adjusted to be delayed. The addition of a circuit for such timing adjustment sacrifices the highest transfer rate.

In this embodiment, therefore, data and a receiving amplifier starting signal are simultaneously outputted from a data transmission position. Furthermore, as described above, in order to decrease the added capacitance of the receiving amplifier starting signal line 8 as much as possible, each one of the receiving amplifier starting signal transmitters CD0 to CD2 is arranged at three portions, in which the normal data transmitters TMT0 to TMT11 are relatively concentrated. This is because there is no great difference between the transmission timings among the concentrated normal data transmitters. By doing so, while a total of 13 transmitters and receivers, i.e., the normal data transmitters TMT0 to TMT11 and the receiving amplifier RCV0 are connected to the normal signal line 7, only four transmitters and receivers, i.e., the receiving amplifier starting signal transmitters CD0 to CD2 and the receiving amplifier starting signal receiver CR0 are connected to the receiving amplifier starting signal line 8, which makes it possible to decrease load capacitance. A signal line (G) between the receiving amplifier starting signal line (C-CC) and the normal signal line (S0-SS0) is provided to isolate coupling noise between the former signal line for a small-amplitude signal and the latter signal line for a high amplitude signal. This signal line (G) may be a dedicated fixed potential line or a signal line of a different type the potential of which has no change during data transfer. In addition, PRC connected to the receiving amplifier starting signal line (C-CC) and the normal signal lines (S0-SS0, S1-SS1, S2-SS2, and S3-SS3) serves as a precharge circuit which prevent the floating of the normal signal lines 7 and the receiving signal line 8 when none of the transmitters are activated.

Figure 7:
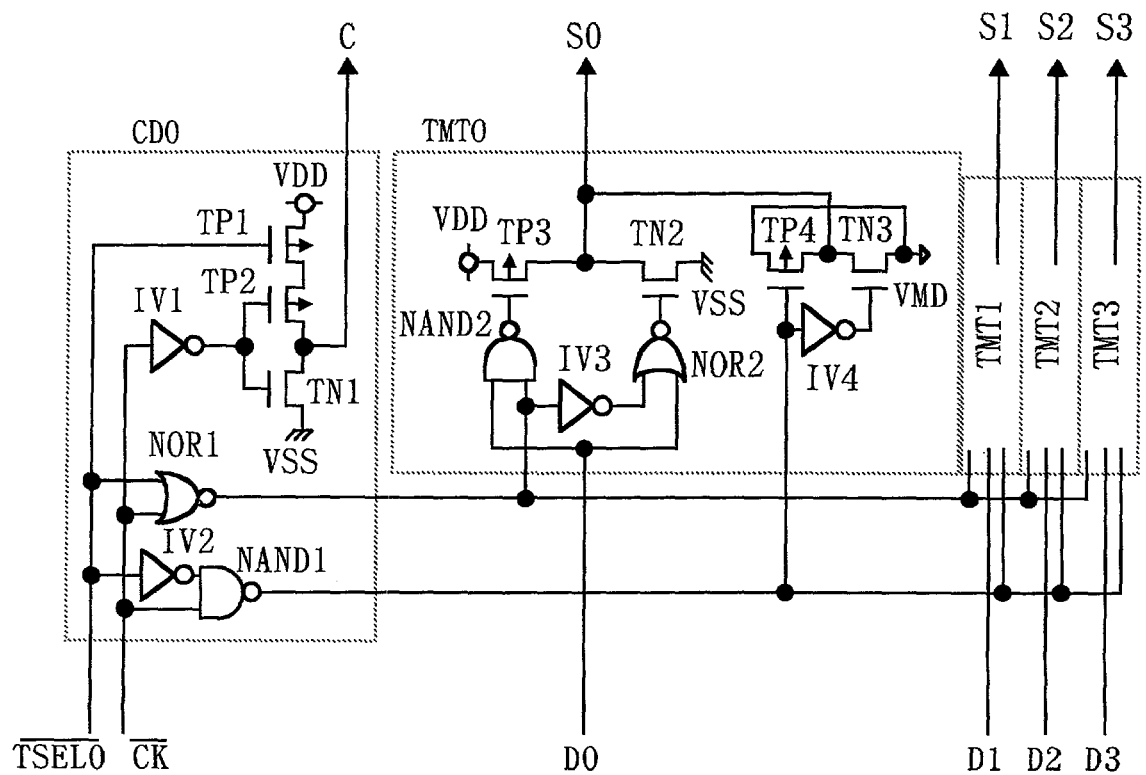
FIG. 7 is a circuit diagram showing a receiving amplifier starting signal transmitter and a normal data transmitter shown in FIG. 6 in the semiconductor device in one embodiment according to the present invention.
Figure 8:
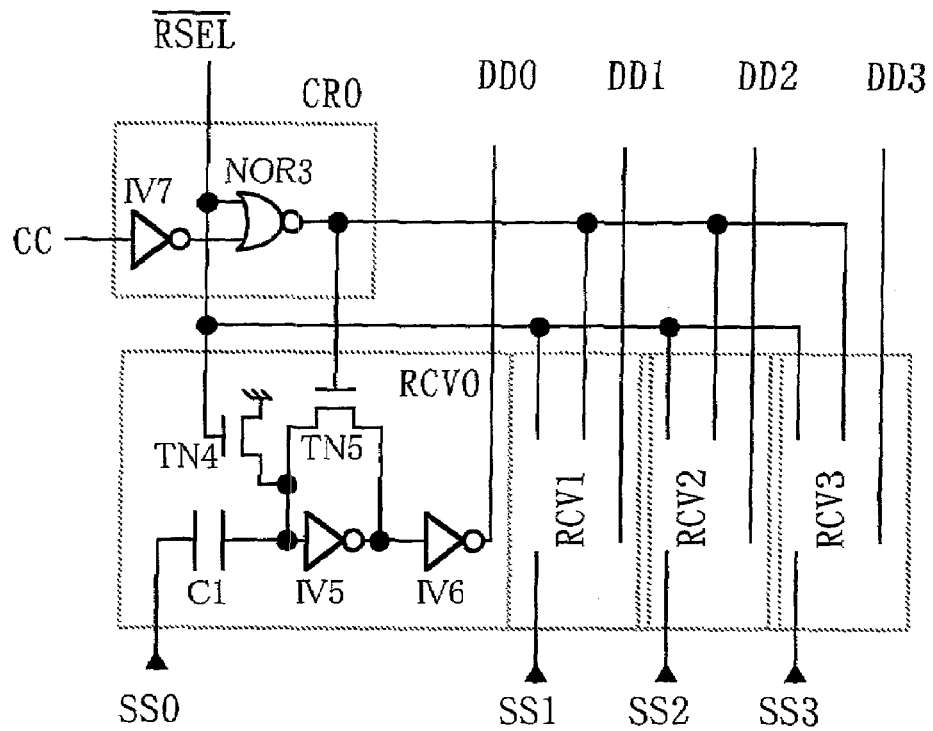
FIG. 8 is a circuit diagram showing a receiving amplifier starting signal transmitter and a receiving amplifier shown in FIG. 6 in the semiconductor device in one embodiment according to the present invention.
Figure 9:
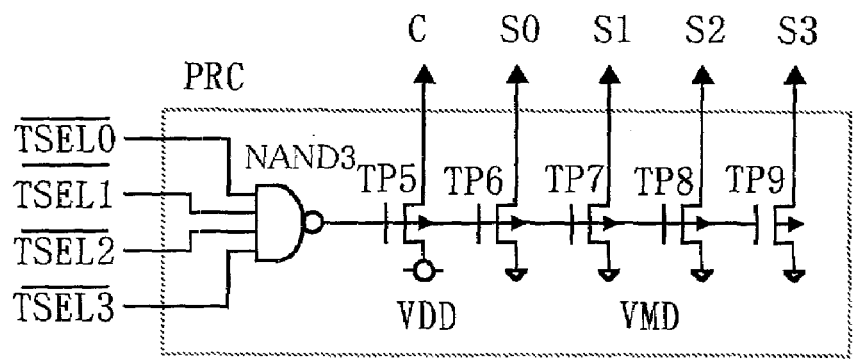
FIG. 9 is a circuit diagram showing a precharge circuit shown in FIG. 6 in the semiconductor device in one embodiment according to the present invention.

Referring to FIGS. 7 to 9, one example of each of the receiving amplifier starting signal transmitter, the normal data transmitter, the receiving amplifier starting signal receiver, the receiving amplifier, and the precharge circuit in the semiconductor device shown in FIG. 6 will be described. FIG. 7 is a circuit diagram showing the receiving amplifier starting signal transmitter and the normal data transmitter, FIG. 8 is a circuit diagram showing the receiving amplifier starting signal receiver and the receiving amplifier, and FIG. 9 is a circuit diagram showing the precharge circuit.

In FIG. 7, the receiving amplifier starting signal transmitter CD0 consists of two PMOS transistors TP1 and TP2 and an NMOS transistor TN1 which are connected between the power supply potential VDD and the ground potential VSS, an inverter IV1 which is connected to the gate of the PMOS transistor TP2 and that of the NMOS transistor TN1, an NOR gate NOR1 which inputs TSEL/ and CK/, an NAND gate NAND1 which inputs signals inverted by an inverter IV2 from TSEL/ and CK/, and the like. The output signals of the NOR gate NOR1 and the NAND gate NAND1 are supplied to each of the normal data transmitters TMT0 to TMT3. This receiving amplifier starting signal transmitter CD0 is connected to the transmission end C of the receiving amplifier starting signal line from the connection node between the PMOS transistor TP2 and the NMOS transistor TN1. The other receiving amplifier starting signal transmitters CD1 and CD2 are equal to the transmitter CD0 in circuit configuration.

In FIG. 7, the normal data transmitter TMT0 (TMT1 to TMT3 are also equal to TMT0 in configuration) consists of a NAND gate NAND2 which inputs input data D0 and the output signal of the NOR gate NOR1 of the receiving amplifier starting signal transmitter CD0, a NOR gate NOR2 which inputs the data D0 and signals obtained by inverting the output signals of the NOR gate NOR1 of the receiving amplifier starting signal transmitter CD0 by an inverter IV3, a PMOS transistor TP3 which is gate-controlled by the output signal of the NAND gate NAND2, an NMOS transistor TN2 which is gate-controlled by the output signal of the NOR gate NOR2, a PMOS transistor TP4 which is gate-controlled by the output signal of the NAND gate NAND1 of the receiving amplifier starting signal transmitter CD0, an NMOS transistor TN3 which is gate-controlled by a signal obtained by inverting the output signal of the NAND gate NAND1 by an inverter IV4, and the like. The other normal data transmitters TMT4 to TMT11 are equal to TMT0 (TMT1 to TMT3) in circuit configuration.

Among the constituent elements of the normal data transmitter TMT0, a section consisting of the NAND gate NAND2, the inverter IV3, the NOR gate NOR2, the PMOS transistor TP3, the NMOS transistor TN2 and the like is a circuit in which the source of the PMOS transistor TP3 is connected to the power supply potential VDD and the source of the NMOS transistor TN2 is connected to the ground potential VSS and which changes the output level of the normal signal line (S0) in a range between VDD and VSS for a specific period (in pulses) according to the level of the data D0. In addition, a section consisting of the PMOS transistor TP4, the inverter IV4, the NMOS transistor TN3, and the like is a circuit in which the sources of the PMOS transistor TP4 and the NMOS transistor TN3 are connected to the intermediate potential VMD between the power supply potential VDD and the ground potential VSS and which controls the normal signal line (S0) so as to function between VDD and VSS.

In FIG. 8, the receiving amplifier RCV0 (RCV1 to RCV3 are also equal to ROV0 in configuration) consists of a circuit using a chopper comparator and includes a capacitor C1 having one electrode connected to the normal signal line (SS0), an inverter IV5 connected to the other electrode of the capacitor C1, an inverter IV6 connected to the inverter IV5, an NMOS transistor TN4 connected to the other electrode of the capacitor C1 and gate-controlled by RSEL/, an NMOS transistor TN5 connected between the input and output of the inverter IV5 and gate-controlled by the output signal of the receiving amplifier starting signal receiver CR0, and the like. An output (DD0) is fetched from the inverter IV6.

In addition, in FIG. 8, the receiving amplifier starting signal receiver CR0 consists of an inverter IV7 which is connected to the receiving amplifier starting signal line (CC), a NOR gate NOR3 which inputs the output signal of the inverter IV7 and RSEL/, and the like. The receiving amplifier starting signal receiver CR0 can control the receiving amplifier RCV0 by the output signal of the NOR gate NOR3.

In FIG. 9, as described above, the precharge circuit PRC is a circuit which prevents the receiving amplifier starting signal line and the normal signal line from turning into a floating state when none of the transmitters are activated. The precharge circuit PRC consists of a NAND gate NAND3 which inputs TSEL0/ to TSEL3/, PMOS transistors TP5 to TP9 which are gate-controlled by the output signal of the NAND gate NAND 3, and the like. The source of the PMOS transistor TP5 is connected to the power supply potential VDD and those of the other PMOS transistors TP6 to TP9 are connected to the intermediate potential VMD between the power supply potential VDD and the ground potential VSS. The drain of the PMOS transistor TP5 is connected to the receiving amplifier starting signal line (C) and those of the other PMOS transistors TP6 to TP9 are connected to the normal signal lines (S0 to S3), respectively.

Referring to FIGS. 10 to 18, one example of the other configuration of the semiconductor device in this embodiment compared with that shown in FIGS. 6 to 9 will be described. FIGS. 10 to 18 are block diagrams and circuit diagrams showing the other configuration of the semiconductor device in this embodiment.

Figure 10:
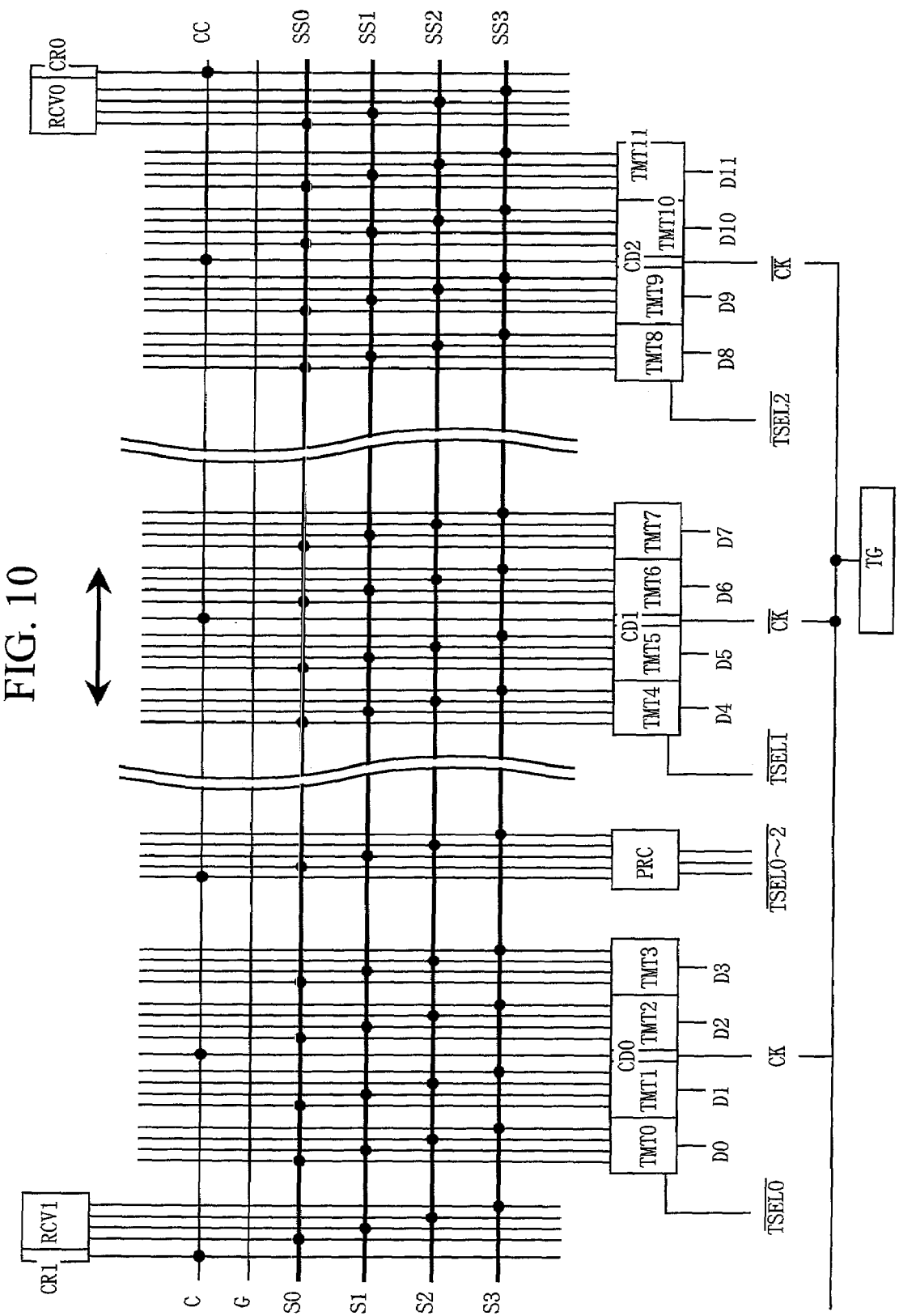
FIG. 10 is a block diagram showing another configuration of the semiconductor device in one embodiment according to the present invention, compared with FIG. 6.

Compared with FIG. 6, FIG. 10 shows an example in which the receiving amplifiers RCV0 and RCV1 and the receiving amplifier starting signal receivers CR0 and CR1 are arranged on the both ends of the semiconductor device, respectively. The receiving amplifier starting signal transmitters CD0 to CD2 are arranged at almost the centers of the portions in which the normal data transmitters TMT0 to TMT11 are relatively concentrated (CD0 is arranged at the center of TMT0 to TMT3, CD1 at the center of TMT4 to TMT7, and CD2 at the center of TMT8 to TMT11), respectively. By so arranging, it is possible to take appropriate timing regardless of data transfer direction such as from left or right.

Figure 11:
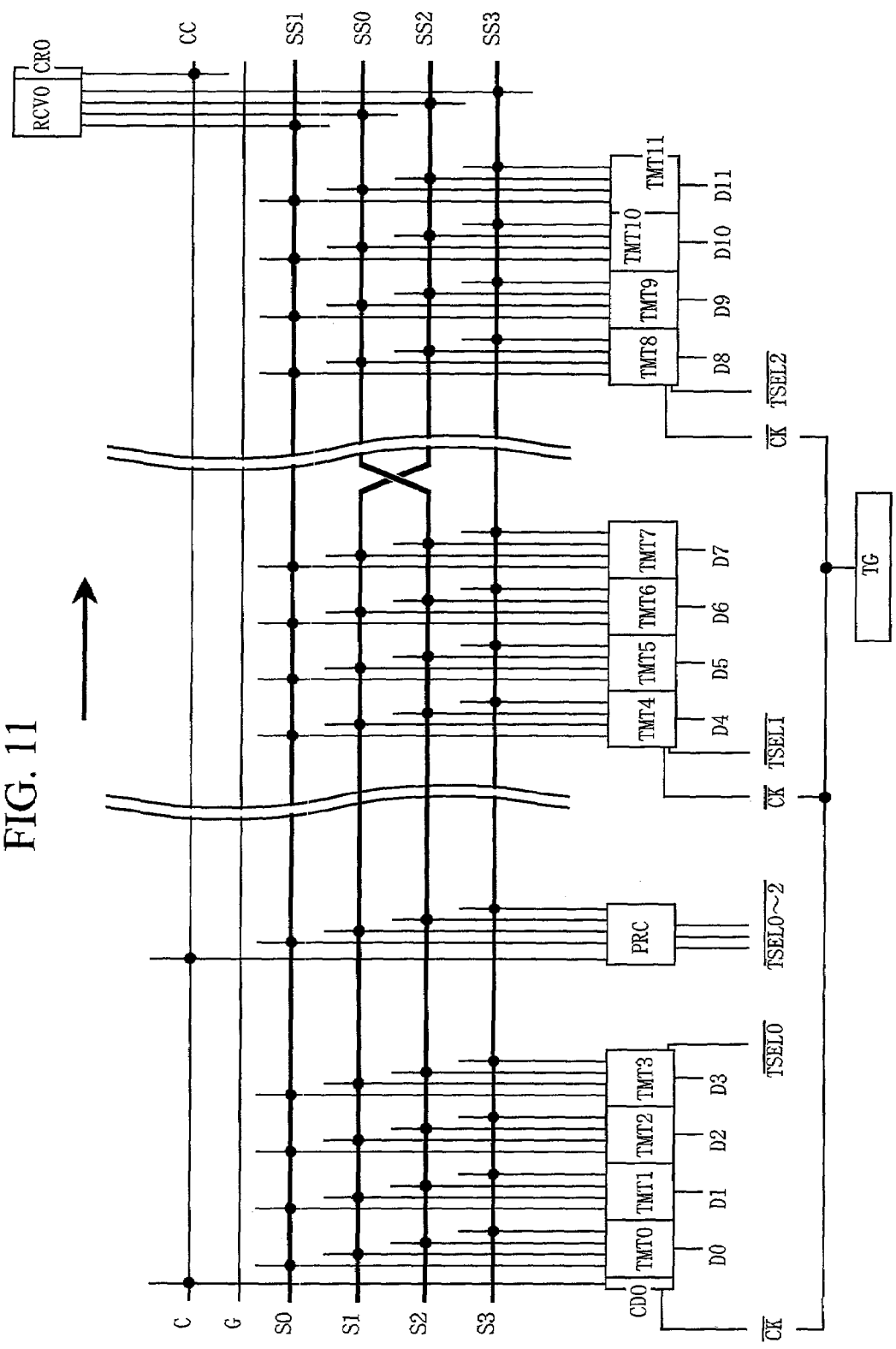
FIG. 11 is a block diagram showing a modification of the semiconductor device shown in FIG. 6 in one embodiment according to the present invention.

FIG. 11 is a modification of FIG. 6. Although data transfer time required in a chip differs depending on the arrangement of circuits, the slowest access rate of a DRAM or the like is given according to the standard. In the data transfer system shown in FIG. 11, a path from the normal data transmitter TMT0 to the receiving amplifier RCV0 is the longest and the rate of the path is controlled. The normal data transmitters TMT1 to TMT11 are faster than the normal data transmitter TMT0. Therefore, the receiving amplifier starting signal transmitter CD0 is arranged only in the vicinity of the TMT0 taking the longest path. Further, while FIG. 6 shows that the lengths of the lead wirings orthogonal to the normal signal lines (S0-SS0, S1-SS1, S2-SS2 and S3-SS3) are set equal, FIG. 11 shows that those of lead wirings orthogonal to the normal signal lines are set shortest, respectively. This is because the normal signal line (S0-SS0) having the longest lead wiring among the normal signal lines controls the transfer rate. Furthermore, in this embodiment, it is the receiving amplifier starting signal line (C-CC) and the respective normal signal lines (S0-SS0, S1-SS1, S2-SS2 and S3-SS3) that relate to signal transfer, and the normal signal lines themselves are irrelevant to the signal transfer. Therefore, as shown in FIG. 11, the normal signal line (S1-SS1) and the normal signal line (S2-SS2) may cross each other for the convenience of the layout.

Figure 12:
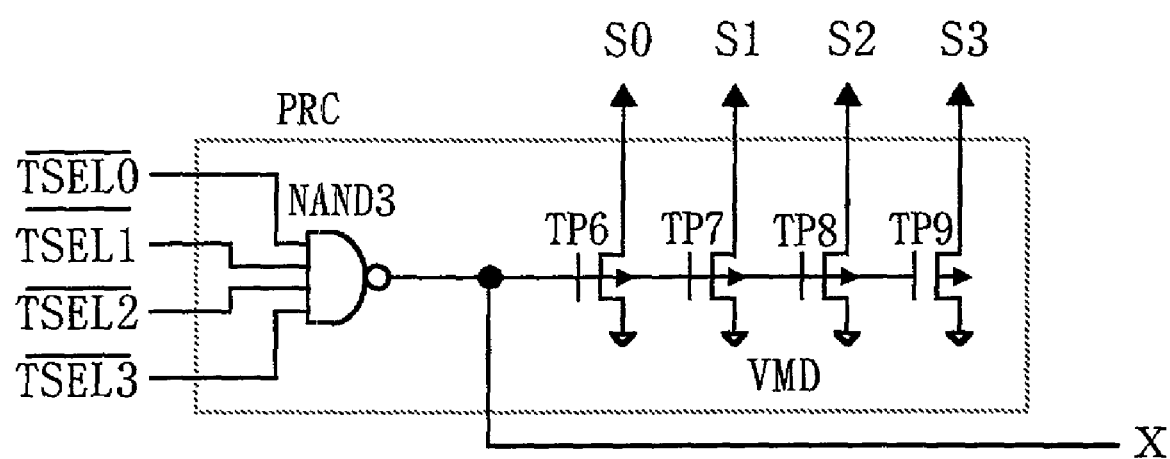
FIG. 12 is a circuit diagram showing a precharge circuit shown in FIG. 11 in the semiconductor device in one embodiment according to the present invention.

FIG. 12 is a circuit diagram of the precharge circuit shown in FIG. 11. Compared with FIG. 9, the precharge circuit PRC shown in FIG. 12 is constituted so that the first PMOS transistor TP5 is removed out of the PMOS transistors TP5 to TP9 which are gate-controlled by the output signal of the NAND gate NAND3 which inputs TSEL0/ to TSEL3/ and so that the output signal (X) of the NAND gate NAND3 is directly supplied to the receiving amplifier starting signal transmitter CD0.

Figure 13:
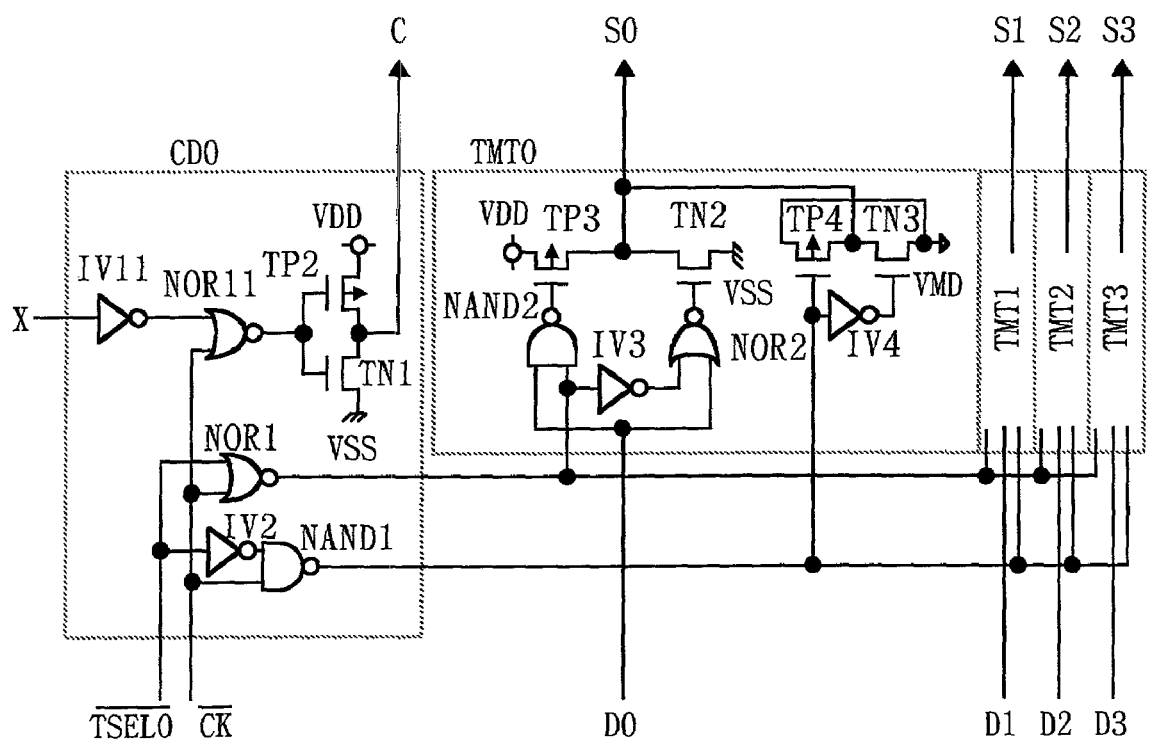
FIG. 13 is a circuit diagram showing a receiving amplifier starting signal transmitter and a normal data transmitter shown in FIG. 11 in the semiconductor device in one embodiment according to the present invention.

FIG. 13 is a circuit diagram of the receiving amplifier starting signal transmitter and the normal data transmitter shown in FIG. 11. Compared with FIG. 7, the receiving amplifier starting signal transmitter CD0 shown in FIG. 13 is constituted so that the PMOS transistor TP1 is removed out of the two PMOS transistors TP1 and TP2 and the NMOS transistor TN1 connected between the power supply potential VDD and the ground potential VSS and so that the PMOS transistor TP2 and the NMOS transistor TN1 are gate-controlled through a NOR gate NOR11 and an inverter IV11. The output signal (X) of the NAND gate NAND 3 of the receiving amplifier RCV is inputted in to the inverter IV11. The NOR gate NOR11, which inputs the output signal of the inverter IV11 and CK/, is driven and the PMOS transistor TP2 and the NMOS transistor TN1 are controlled by the output signal of the NOR gate NOR11.

Further, in FIG. 13, the normal data transmitter TMT0 (TMT1 to TMT3 are also equal to TMT0 in configuration) is equal to that shown in FIG. 7 in circuit configuration.

Figure 14:
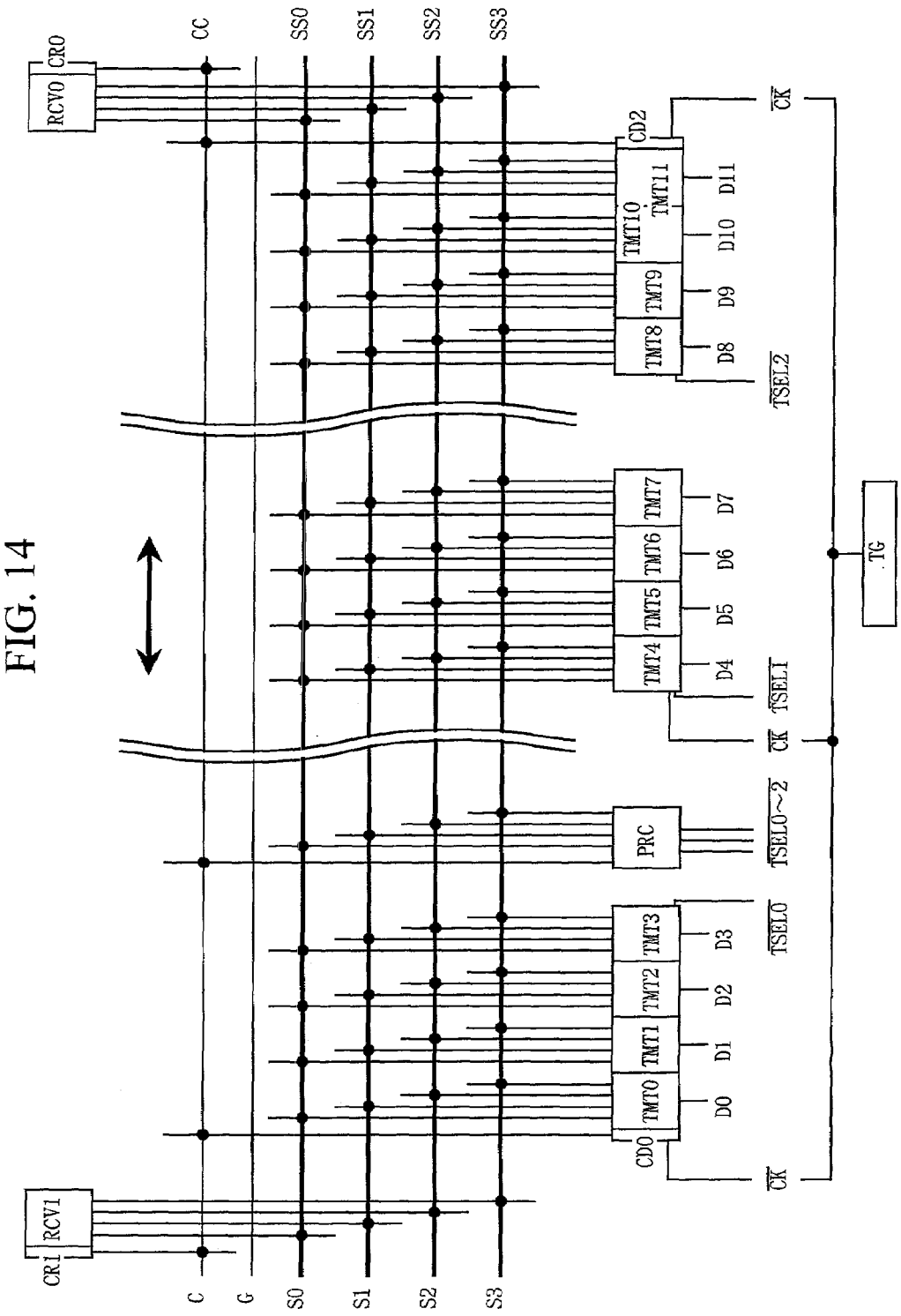
FIG. 14 is a block diagram showing another configuration of the semiconductor device in one embodiment according to the present invention, compared with FIG. 11.

FIG. 14 shows an example, compared with FIG. 11, in which the receiving amplifiers RCV0 and RCV1 and the receiving amplifier starting signal receivers CR0 and CR1 serving as the receiving circuit are arranged on the both ends of the semiconductor device, respectively. In this example, the receiving amplifiers RCV0 and RCV1 are arranged on the both ends of the semiconductor device, respectively. Therefore, the receiving amplifier starting signal transmitters CD0 and CD2 are arranged only in the vicinity of the normal data transmitters TMT0 and TMT11 each having the longest path, respectively, whereby data transfer direction can be arbitrarily set, left or right.

Figure 15:
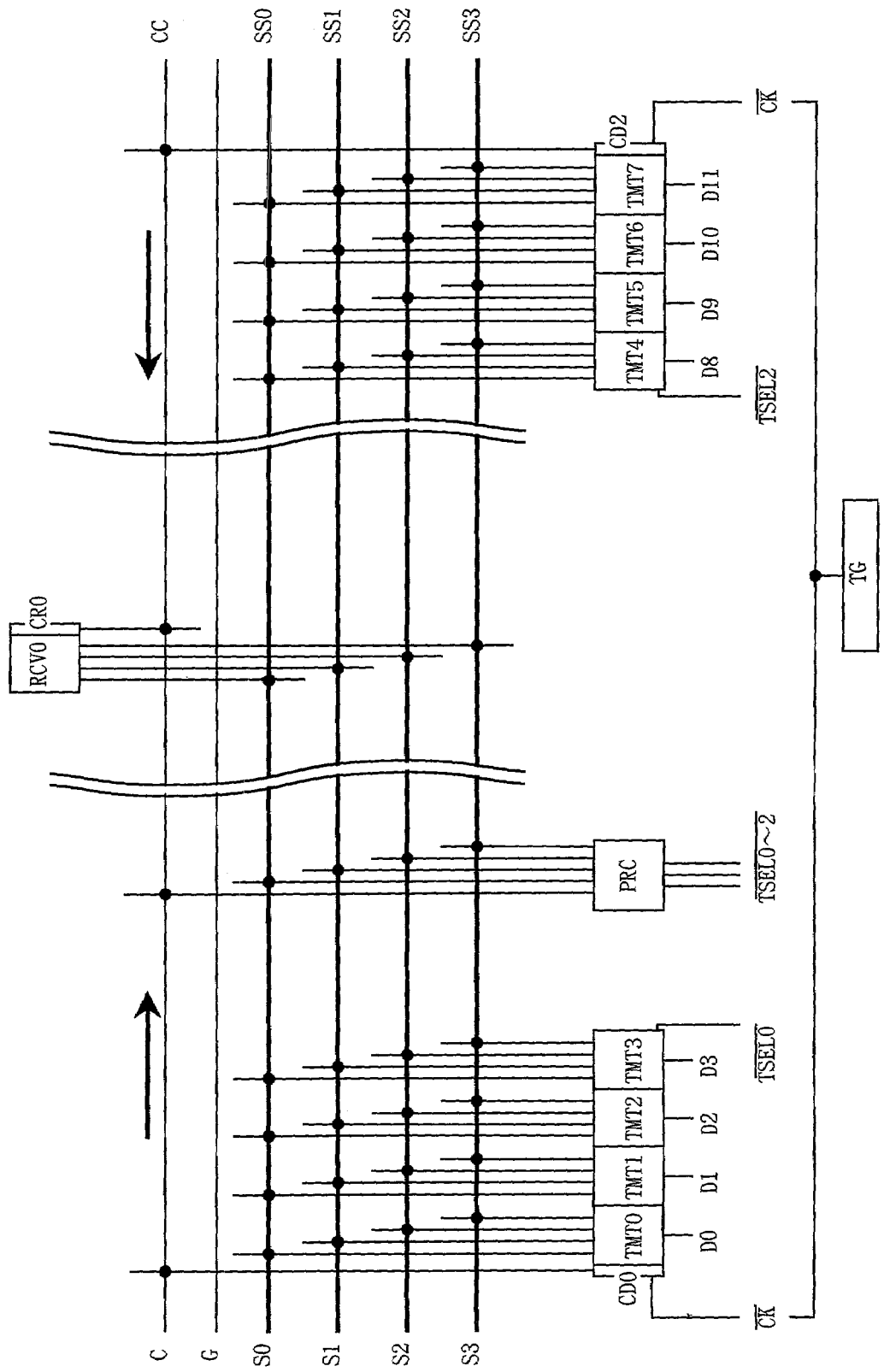
FIG. 15 a block diagram showing yet another configuration of the semiconductor device in one embodiment according to the present invention, compared with FIG. 11.

FIG. 15 shows an example, compared with FIG. 11, in which the receiving amplifier RCV0 and the receiving amplifier starting signal receiver CR0 serving as the receiving circuit are arranged in the central portion of the normal signal lines (S0-SS0, S1-SS1, S2-SS2, and S3-SS3). In this example, since the receiving amplifier RCV0 is arranged in the central portion of the normal signal lines, both data transfer directions from left or right to the central portion can be set.

Figure 16:
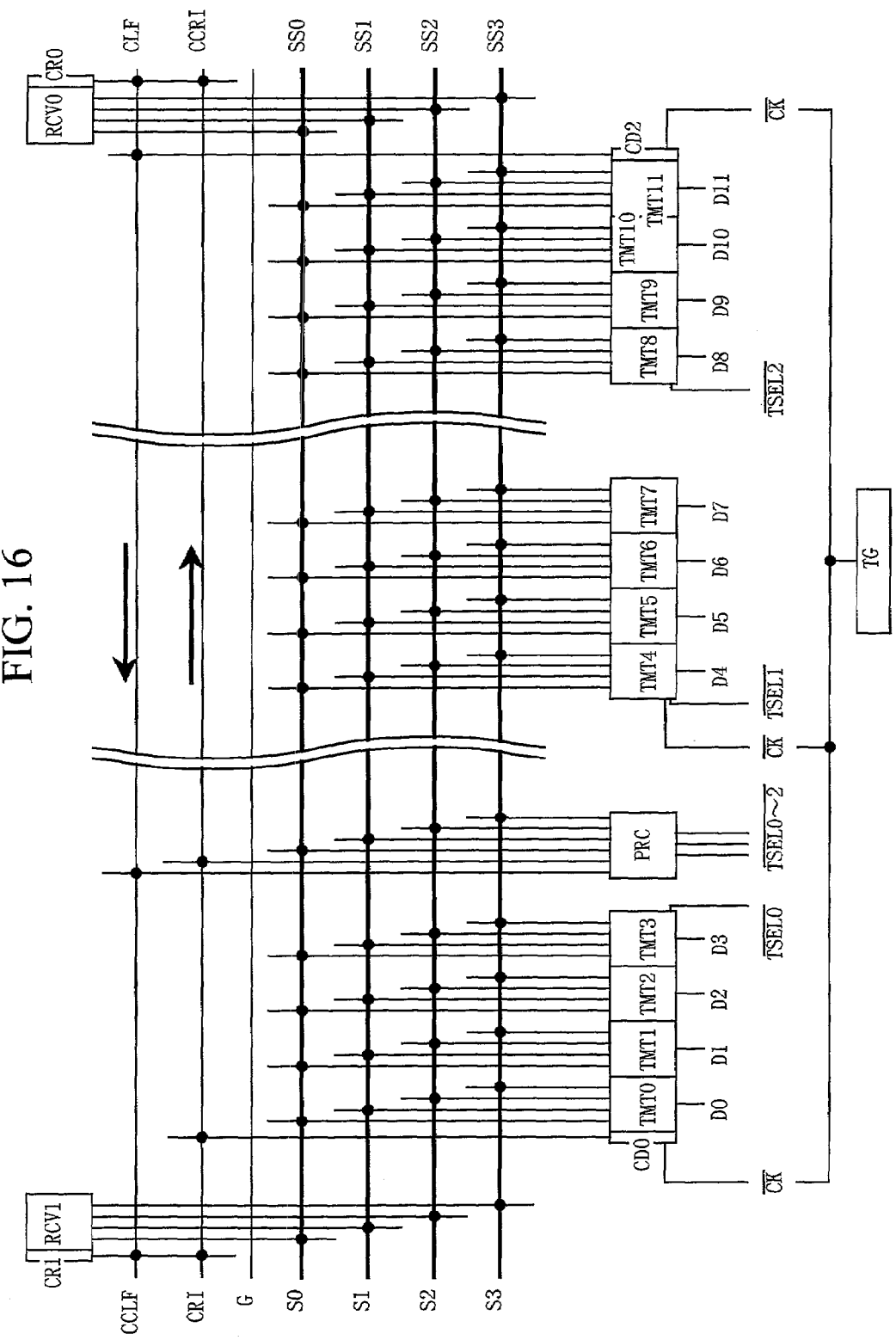
FIG. 16 is a block diagram showing yet another configuration of the semiconductor device in one embodiment according to the present invention, compared with FIG. 11.

FIG. 16 shows an example, compared with FIG. 11, in which receiving amplifier starting signals are applied independently for the transfer to the right and the transfer to the left, respectively. In this example, the receiving amplifier RCV0 and the receiving amplifier starting signal receiver CR0 are arranged on the right end of the semiconductor device and the receiving amplifier RCV1 and the receiving amplifier starting signal receiver CR1 are arranged on the left end thereof, in which the receiving amplifier starting signal can be transferred from CRI to CCRI in the right direction and from CLF to CCLF in the left direction.

Figure 17:
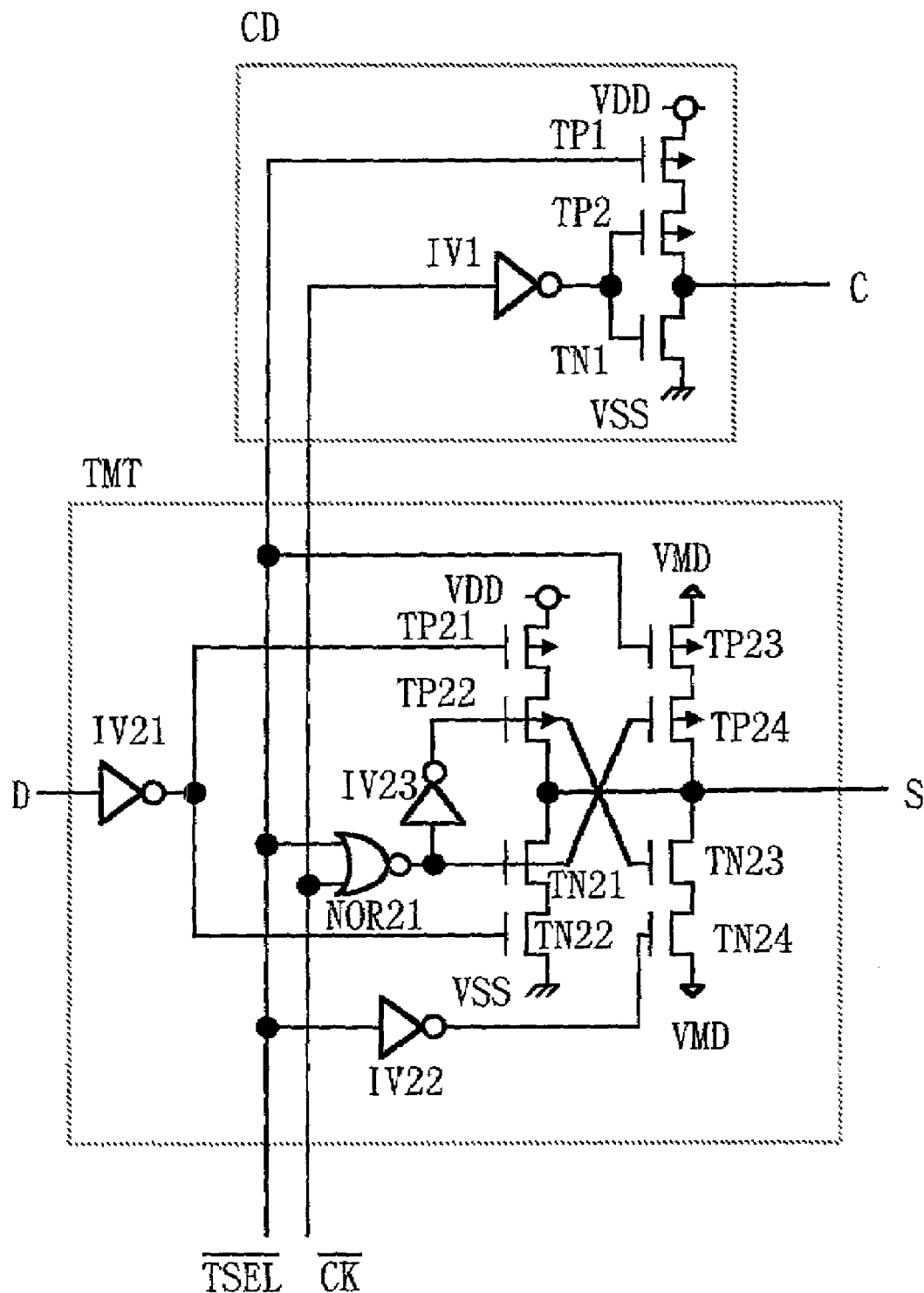
FIG. 17 is a circuit diagram showing a modification of the receiving amplifier starting signal transmitter and the normal data transmitter in the semiconductor device in one embodiment according to the present invention.

FIG. 17 shows a modification of the receiving amplifier starting signal transmitter and the normal data transmitter. Compared with FIG. 7, the receiving amplifier starting signal transmitter CD shown in FIG. 17 consists only of two PMOS transistors TP1 and TP2 and an NMOS transistor TN1 which are connected between the power supply potential VDD and the ground potential VSS, and an inverter IV1 which is connected to the gate of the PMOS transistor TP2 and that of the NMOS transistor TN1.

Further, in FIG. 17, the normal data transmitter TMT consists of an inverter IV21 which inputs data D, a NOR gate NOR21 which inputs TSEL/ and CK/, an inverter IV22 which inputs TSEL/, an inverter IV23 which inputs the output signal of the NOR gate NOR21, two PMOS transistors PT21 and TP22 and two NMOS transistors TN21 and TN22 which are connected between the power supply potential VDD and the ground potential VSS, two PMOS transistors TP23 and TP24 and two NMOS transistors TN23 and TN24 which are connected between the connection node between the PMOS transistor TP22 and the NMOS transistor TN21 and the intermediate potential VMD, and the like. The normal data transmitter TMT is connected to the normal signal line (S) from the connection node between the PMOS transistor TP22 and the NMOS transistor TN21. The PMOS transistor TP21 and the NMOS transistor TN22 are gate-controlled by the output signal of the inverter IV21. The PMOS transistor TP22 and the NMOS transistor TN23 are gate-controlled by the output signal of the inverter IV23. The NMOS transistor TN21 and the PMOS transistor TP24 are gate-controlled by the output signal of the NOR gate NOR21. The PMOS transistor TP23 is gate-controlled by TSEL/, and the NMOS transistor TN24 is gate-controlled by a signal obtained by inverting TSEL/ via the inverter IV22.

Figure 18:
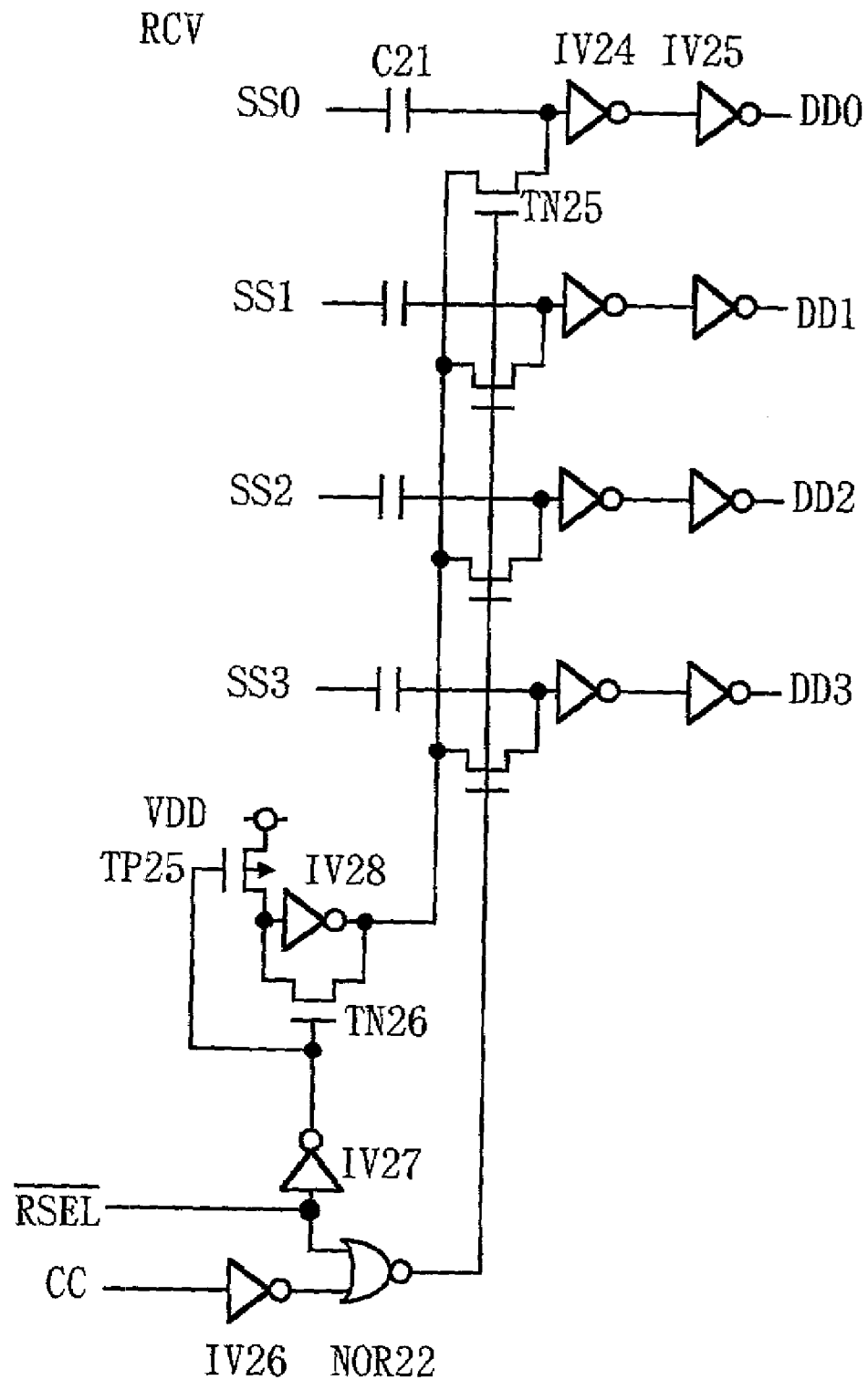
FIG. 18 is a circuit diagram showing a modification of the receiving amplifier in the semiconductor device in one embodiment according to the present invention.

FIG. 18 shows a modification of the receiving amplifier. The receiving amplifier RCV consists of a capacitor C21 having one electrode connected to the normal signal line (SS0), an inverter IV24 connected to the other electrode of the capacitor C21, an inverter IV25 connected to the inverter IV24, an NMOS transistor TN25 connected to the other electrode of the capacitor C21, and the like. The receiving amplifier includes a section in which an output (DD0) is fetched from the inverter IV25. Four sections of this type are provided to fetch outputs (DD0 to DD3), respectively. The receiving amplifier RCV also includes an inverter IV26 connected to the receiving amplifier starting signal line (CC), a NOR gate NOR22 which inputs the output signal of the inverter IV26 and RSEL/, an inverter IV27 which inputs RSEL/, a PMOS transistor TP25 and an NMOS transistor TN26 which are gate-controlled by the output signal of the inverter IV27, an inverter IV28 which is connected between the source and the drain of the NMOS transistor TN26, and the like. The NMOS transistor TN25 is gate-controlled by the output signal of the NOR gate NOR22. An output from the inverter IV28 is connected to the drain of the NMOS transistor TN25.

Figure 19:
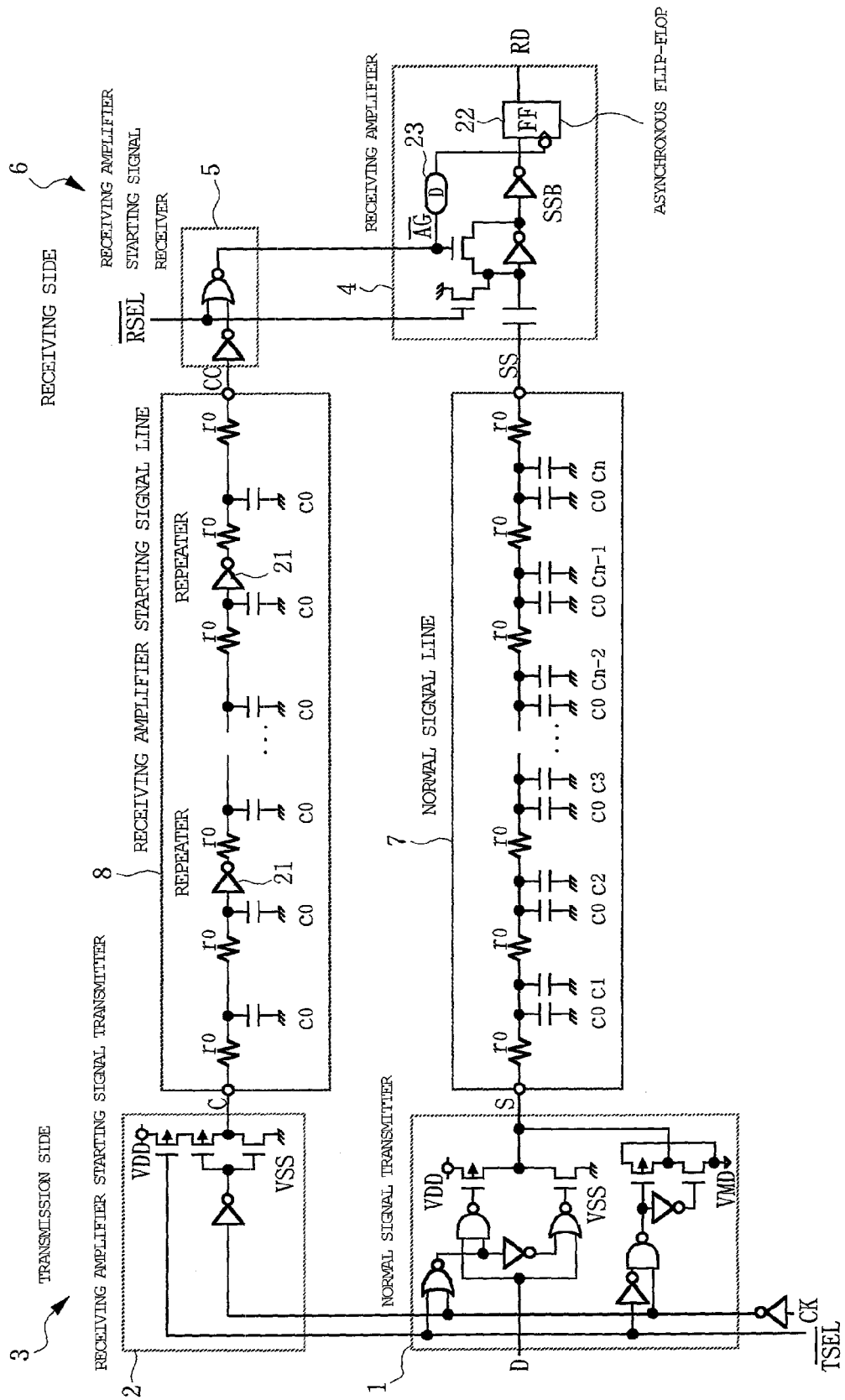
FIG. 19 is a schematic diagram showing a modification of the semiconductor device for realizing the high rate data transfer circuit method of the present invention.

Referring to FIG. 19, the schematic of a modification of the semiconductor device for realizing the high rate data transfer circuit method of the present invention, compared with FIG. 2, will be described. FIG. 19 is a schematic diagram showing a modification of the semiconductor device for realizing the high rate data transfer circuit method of the present invention.

In FIG. 19, repeaters 21 are inserted into the receiving amplifier starting signal line 8 shown in FIG. 2. Namely, the repeaters 21 are inserted into a metal wiring which has a resistance value r0 and a capacitance value c0 per unit length, at predetermined intervals. If no repeater 21 is provided, the fastest transmission rate of the normal signal line 7 is equal to that of the receiving amplifier starting signal line 8. By inserting the repeaters 21 and adopting a so-called clock division method to be described later, the transmission rate of the receiving amplifier starting signal is increased. In FIG. 19, the semiconductor device has such a circuit configuration that an asynchronous flip-flop 22 is added to the output end of the receiving amplifier 4 and the asynchronous flip-flop 22 outputs an output signal (RD) synchronously with the timing generated by delaying a receiving amplifier starting signal AG/ from the receiving amplifier starting signal receiver 5 by a delay circuit 23.

Furthermore, as the means for accelerating the semiconductor device shown in FIG. 2, the semiconductor device shown in FIG. 19 is described. However, there is a simpler method therefor achieved by lowering the time constant of the receiving amplifier starting signal line 8, i.e., the simplest method therefor achieved by increasing the wiring width of the receiving amplifier signal line 8. Since the number of the receiving amplifier starting signal lines 8 is small, the increased wiring widths do not greatly influence the layout area.

In the embodiment constituted as stated above, the present invention is applied to the data bus. However, the present invention is not limited to such a purpose. For example, the present invention is also applicable to a wiring having relatively high load capacitance such as an address bus and an I/O line in an array. Further, the present invention is also applicable to a wiring on a board besides the signal wiring in an LSI.

Figure 20:
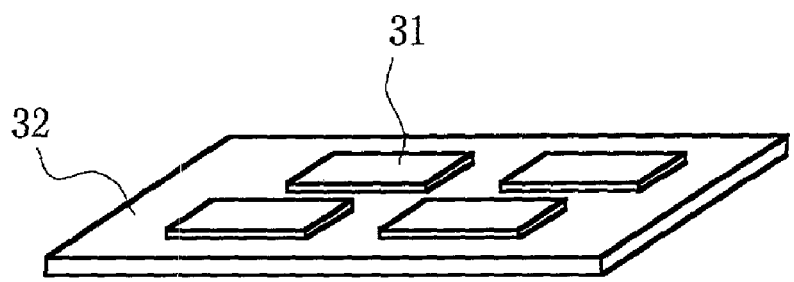
FIG. 20 is a perspective view showing another semiconductor device in one embodiment according to the present invention.
Figure 21:
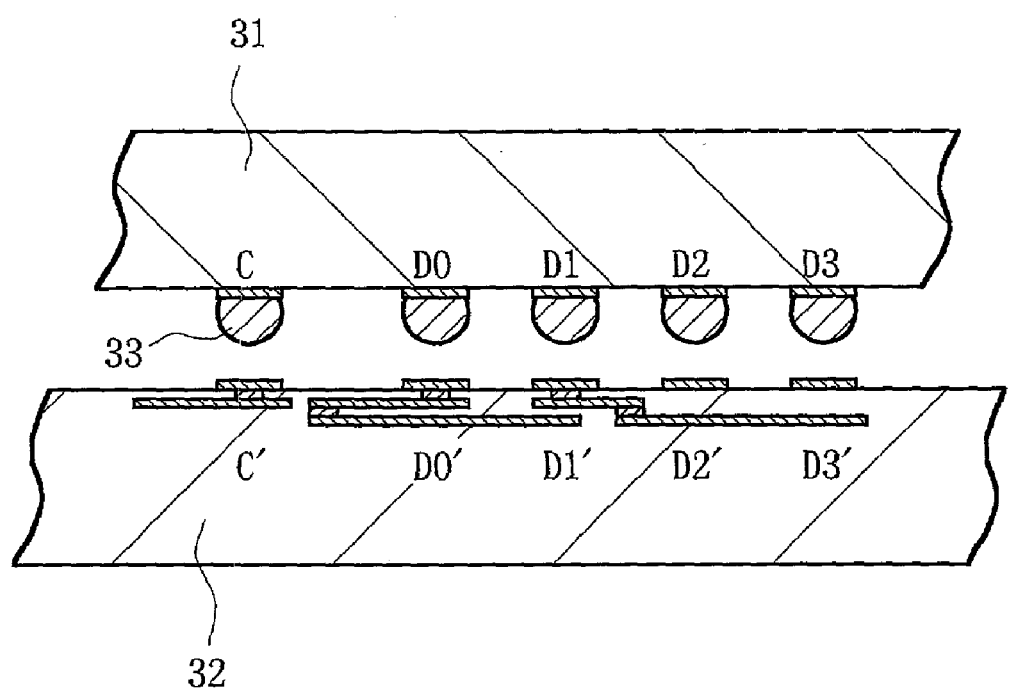
FIG. 21 is an explanatory diagram showing an electrode connection section in another semiconductor device in one embodiment according to the present invention.
Figure 22:
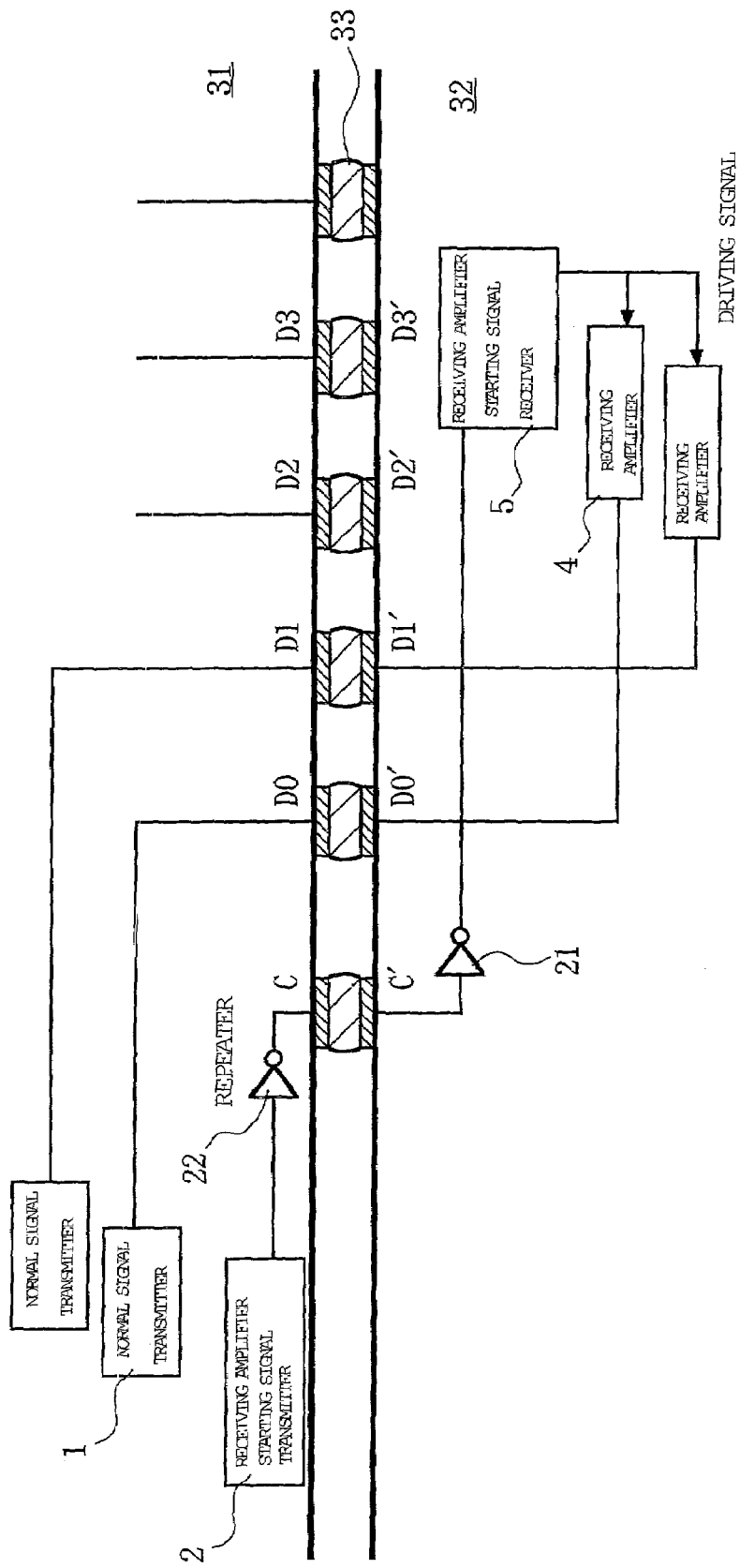
FIG. 22 is an explanatory diagram showing a state in which electrodes are actually connected in another semiconductor device in one embodiment according to the present invention.
Figure 23:
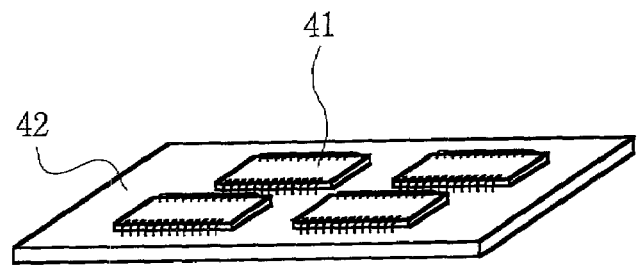
FIG. 23 is a perspective view showing yet another semiconductor device in one embodiment according to the present invention.
Figure 24:
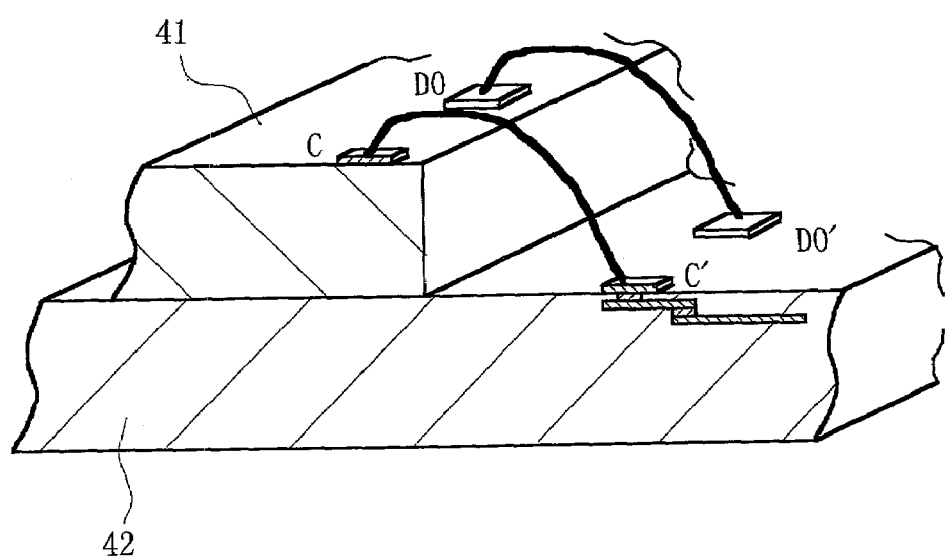
FIG. 24 is an explanatory diagram showing an electrode connection section in yet another semiconductor device in one embodiment according to the present invention.

Referring to FIGS. 20 to 24, one example of the other semiconductor device in one embodiment according to the present invention will be described. FIG. 20 is a perspective view showing another semiconductor device in one embodiment according to the present invention. FIG. 21 is an explanatory diagram showing the connection section between electrodes of the semiconductor device shown in FIG. 20. FIG. 22 is an explanatory diagram showing a state in which the electrodes are actually connected. FIG. 23 is a perspective view showing yet another semiconductor device. FIG. 24 is an explanatory diagram showing the connection section between electrodes of the semiconductor device shown in FIG. 23.

FIG. 20 shows a so-called system-on-chip (SOC) semiconductor device. This semiconductor device is constituted, for example, so that four upper chips 31 are mounted on the surface of a lower chip 32 by flip-chip bonding.

FIG. 21 shows the connection section of the electrodes of the SOC semiconductor device shown in FIG. 20. The upper chip 31 is connected to the lower chip 32 by solder bumps 33 or the like. That is, the contact section C of the electrode of the upper chip 31 is connected to the contact section C' of the electrode of the lower chip 32 through the solder bump 33. Likewise, the contact sections D0, D1, D2, and D3 of the upper chip 31 are connected to the contact sections D0', D1', D2', and D3' of the lower chip 32 through the solder bumps 33, respectively.

FIG. 22 shows a state in which the solder bumps 33 shown in FIG. 21 actually connect the contact sections of the upper and lower chips. Five contact sections represent one receiving amplifier starting signal line 8 and four normal signal lines 7 shown in FIG. 19, respectively. Normally, since a contact section is formed out of a metal wiring layer of several tens μm each side, the contact section has a parasitic capacitance, and thus, the transmission rate is greatly decreased if a normal signal connection method is used. However, by employing the method of the present invention described above, high rate data transmission can be realized.

As shown in FIG. 22, for example, for fear of decreasing the transmission rate of the receiving amplifier starting signal line 8, a repeater 21 is arranged at a position as close as possible to the contact section C of the upper chip 31 on which this receiving amplifier starting signal transmitter 2 is mounted, and another repeater 21 is arranged at a position as close as possible to the contact section C' of the lower chip 32 on which the receiving amplifier starting signal receiver 5 is mounted. By doing so, it is possible to suppress the decrease of the transmission rate. Further, since the normal signal line 7 can directly connect the normal signal transmitter 1 to the receiving amplifier 4 through the contact sections D0 to D3 and D0' to D3', bus design become extremely easy. Note that the flow of a bus signal is directed from the upper chip 31 to the lower chip 32 in FIG. 22, however, the bus signal can flow bidirectionally according to a modification to be described later.

FIGS. 23 and 24 show that upper chips are connected to a lower chip by wire bonding. For example, in a configuration in which four upper chips 41 are mounted on the surface of a lower chip 42 by wiring bonding, the contact section C of the electrode of each upper chip 41 is connected to the contact section C' of the electrode of the lower chip 42 through a wire 43. Likewise, the contact sections D0 and the like of the upper chip 41 are connected to the contact sections D0' and the like of the lower chip 42 through wires 43, respectively.

Further, in FIGS. 20 and 23, a multi chip package (MCP), a multi chip module (MCM) or the like in which the upper chips are mounted on a substrate formed out of an epoxy or polyimide material in place of the lower chip 32 or 42 may be used. These packaging techniques are developed with requirements to make a package small in size, to increase density, to decrease power consumption, to deal with high rate operation, to reduce the cost of an analog/digital embedded LSI, and the like as its setting. The high rate bus transfer technique according to the present invention is suited for these packaging techniques.

Figure 25:
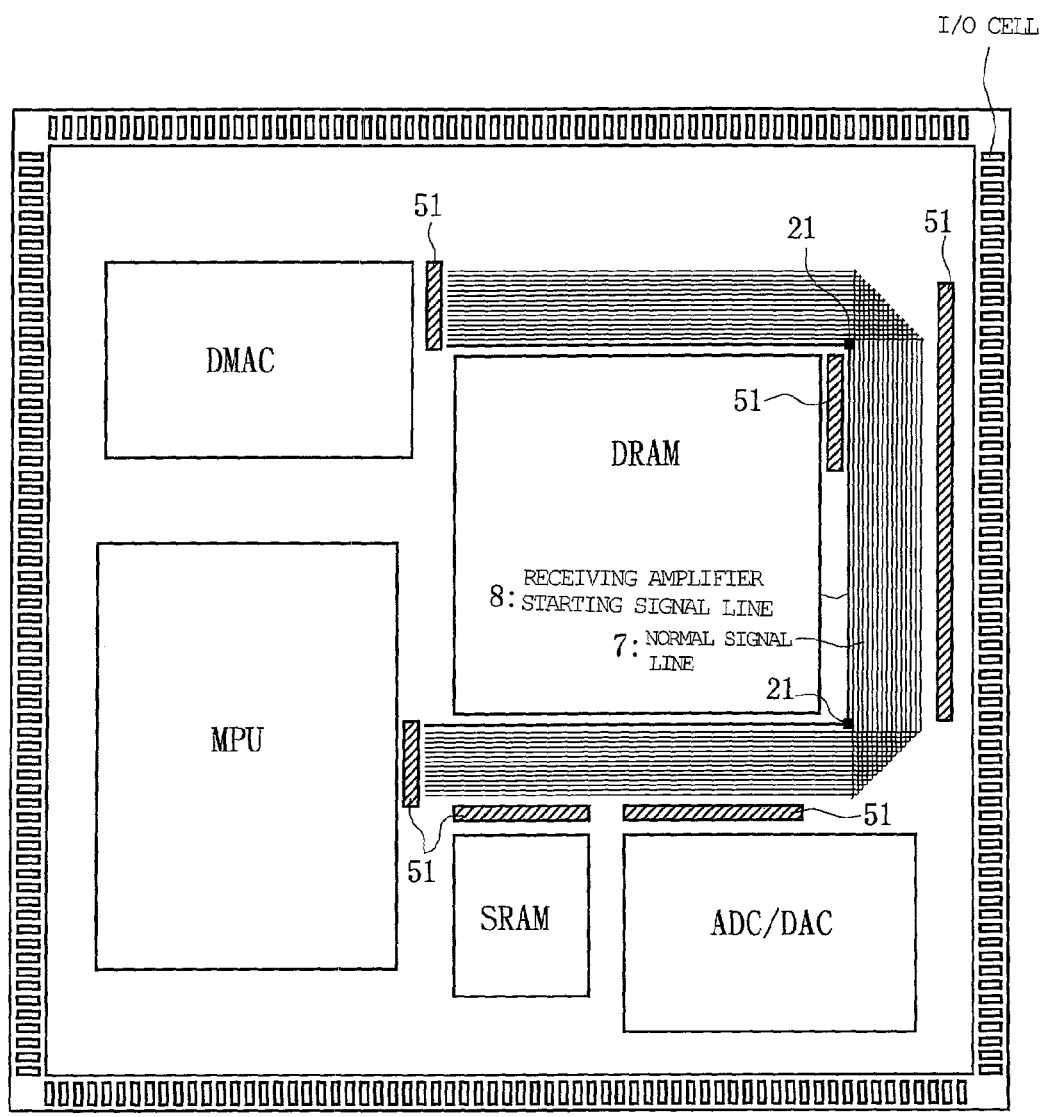
FIG. 25 is a layout drawing showing yet another semiconductor device in one embodiment according to the present invention.
Figure 26:
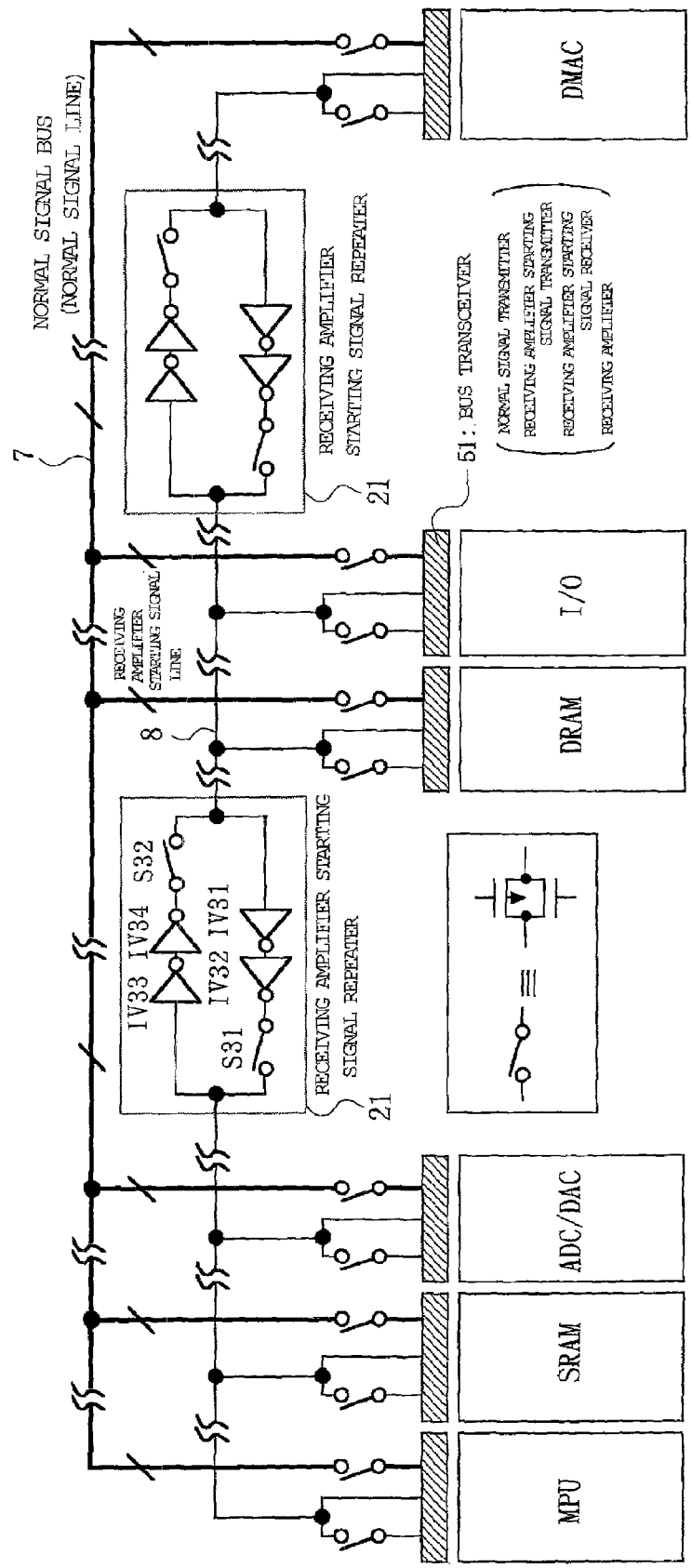
FIG. 26 is a block diagram showing the high rate bus method in yet another semiconductor device in one embodiment according to the present invention.
Figure 27:
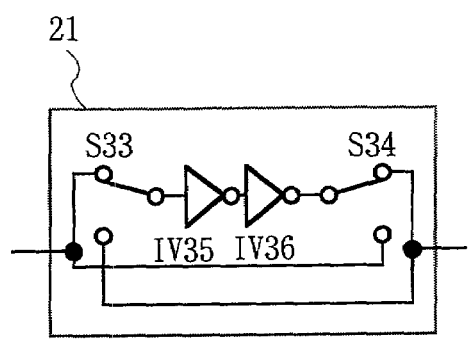
FIG. 27 is a circuit diagram showing a modification of a repeater in yet another semiconductor device in one embodiment according to the present invention.
Figure 28:
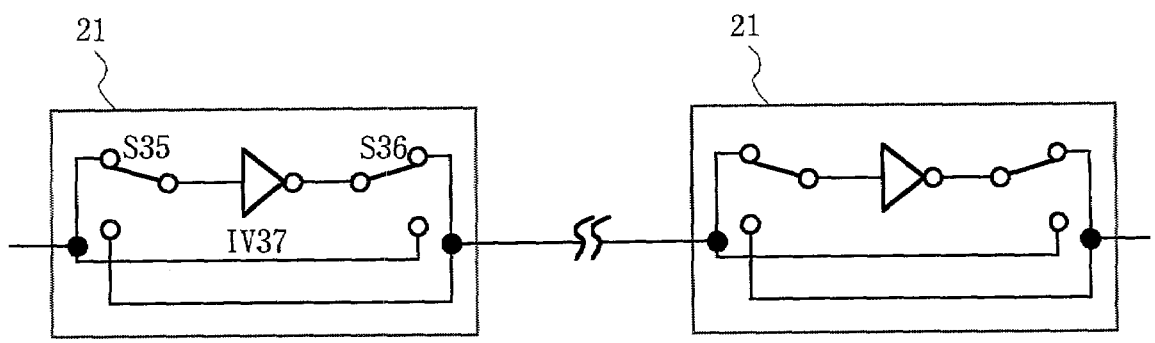
FIG. 28 is a circuit diagram showing another modification of the repeater in yet another semiconductor device in one embodiment according to the present invention.

Referring to FIGS. 25 to 28, one example of yet another semiconductor device in one embodiment of the present invention will be described. FIG. 25 is a layout drawing showing yet another semiconductor device in this embodiment. FIG. 26 is a block diagram showing the high rate bus method. FIGS. 27 and 28 are circuit diagrams showing a modification of the repeater.

FIG. 25 shows a CBIC (cell based IC) semiconductor device employing a bus method. This semiconductor device is constituted of, for example, functional circuits such as MPU (Micro Processing Unit), DRAM (Dynamic Random Access Memory), SRAM (Static Random Access Memory), DMAC (Direct Memory Access Controller), ADC (Analog to Digital Converter)/DAC (Digital to Analog Converter), and I/O (Input/Output) cells mounted on a chip. The respective circuits are connected to one another by normal signal lines 7 and receiving amplifier starting signal lines 8 through a bus transceiver 51 by the bus method. In addition, a repeater 21 is inserted in each corner of the receiving amplifier starting signal line 8. Because of the acceleration of an internal clock, the number of CBIC's which employ such a bus configuration is small. This is because a time constant increases due to the high resistance and high capacitance of a bus wiring. At present, a pipeline method is often employed for the recent CBIC's. The features and disadvantages of the bus method and the pipeline method will become clear in the following description.

FIG. 26 shows an embodiment in which the high rate bus method of the present invention is applied to the CBIC shown in FIG. 25. In this embodiment, the bus of the normal signal line 7 is divided into three regions. Namely, the three regions are: the first region in which the MPU, SRAM and ADC/DAC are arranged; the second region in which the DRAM, and the I/O cells are arranged; and the third region in which the DMAC is arranged. Each circuit includes a bus transceiver 51 which consists of the normal signal line transmitter 1, the receiving amplifier starting signal transmitter 2, the receiving amplifier 4, and the receiving amplifier starting signal receiver 5. The receiving amplifier starting signal lines 8 are connected on the two boundaries of the three regions by repeaters 21, respectively. This is intended to accelerate the transmission of the receiving amplifier starting signal as already described with reference to FIG. 19. Further, a switch and necessary control circuits to change direction are incorporated in each repeater 21 for a bidirectional bus according to a data transmission location (one of the three regions in this case) and a data receiving location (one of the other two regions in this case). The switch S31 (S32) has a pass transistor configuration which consists of a PMOS transistor and an NMOS transistor. In addition, each control circuit is constituted of two inverters IV31 and IV32 (IV33 and IV34) connected in series and two control circuits corresponding to the two directions are provided in the repeater 21.

FIG. 27 shows a modification of the repeater 21. Compared with the repeater 21 shown in FIG. 26, the number of constituent elements of the repeater 21 is reduced and the repeater 21 consists of two switches S33 and S34 which can switchable between two directions and two inverters IV35 and IV36.

FIG. 28 shows another modification of the repeater 21. In FIG. 28, the number of constituent elements is further decreased and the repeater 21 consists of two switches S35 and S36 and one inverter IV37. It is noted, however, that logic inversion occurs every time a signal passes through one repeater 21.

Figure 29:
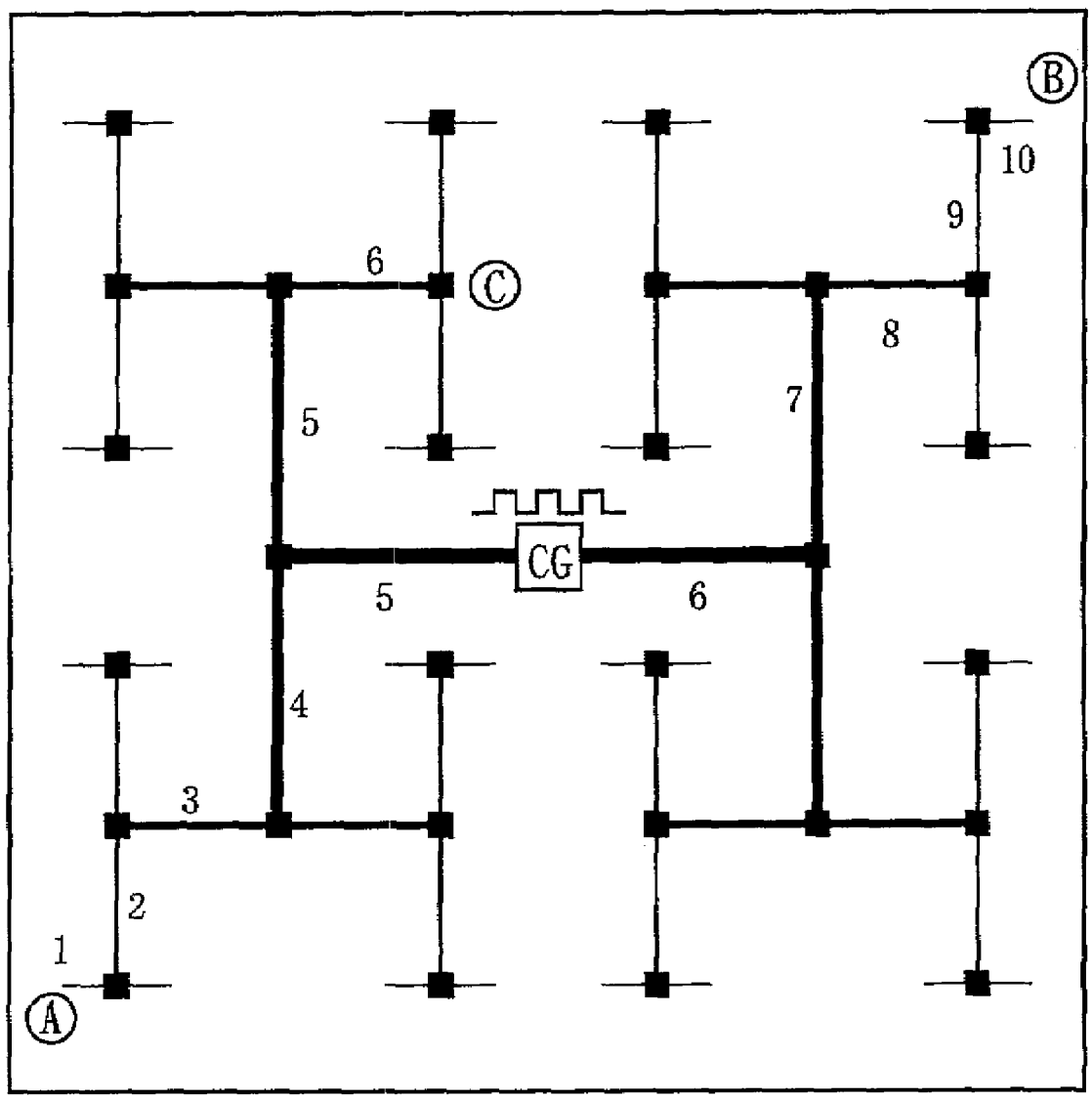
FIG. 29 is a layout drawing showing a clock distribution system in yet another semiconductor device in one embodiment according to the present invention.
Figure 30:
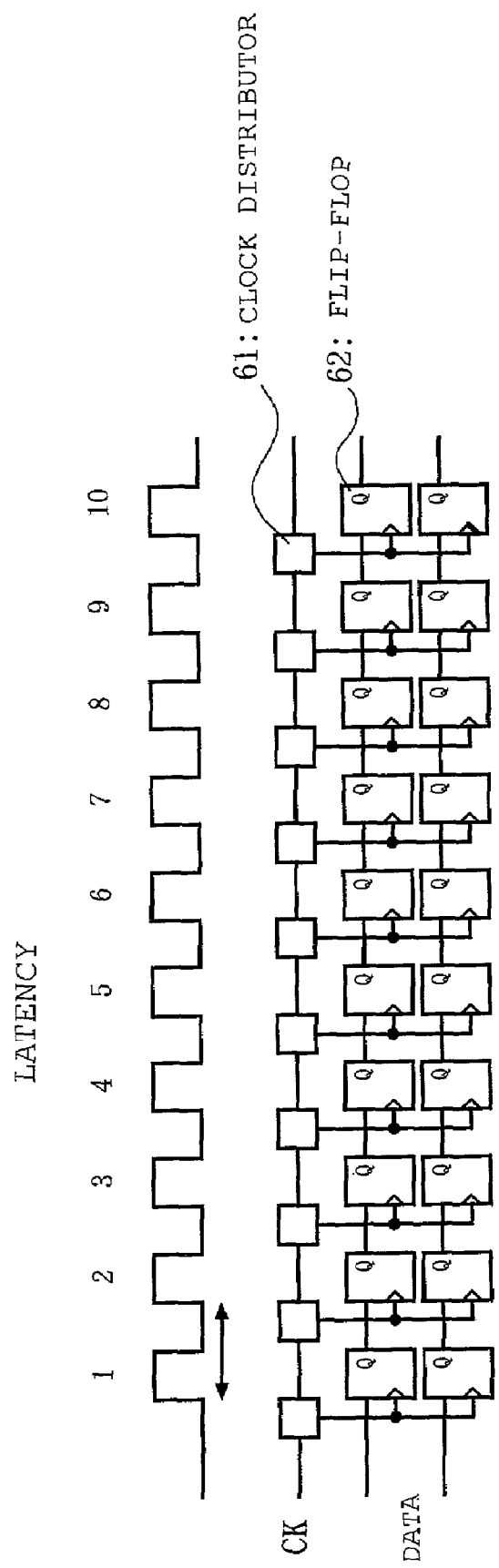
FIG. 30 is an explanatory diagram showing a pipeline structure with a latency set at 10 in the clock distribution system in yet another semiconductor device in one embodiment according to the present invention.
Figure 31:
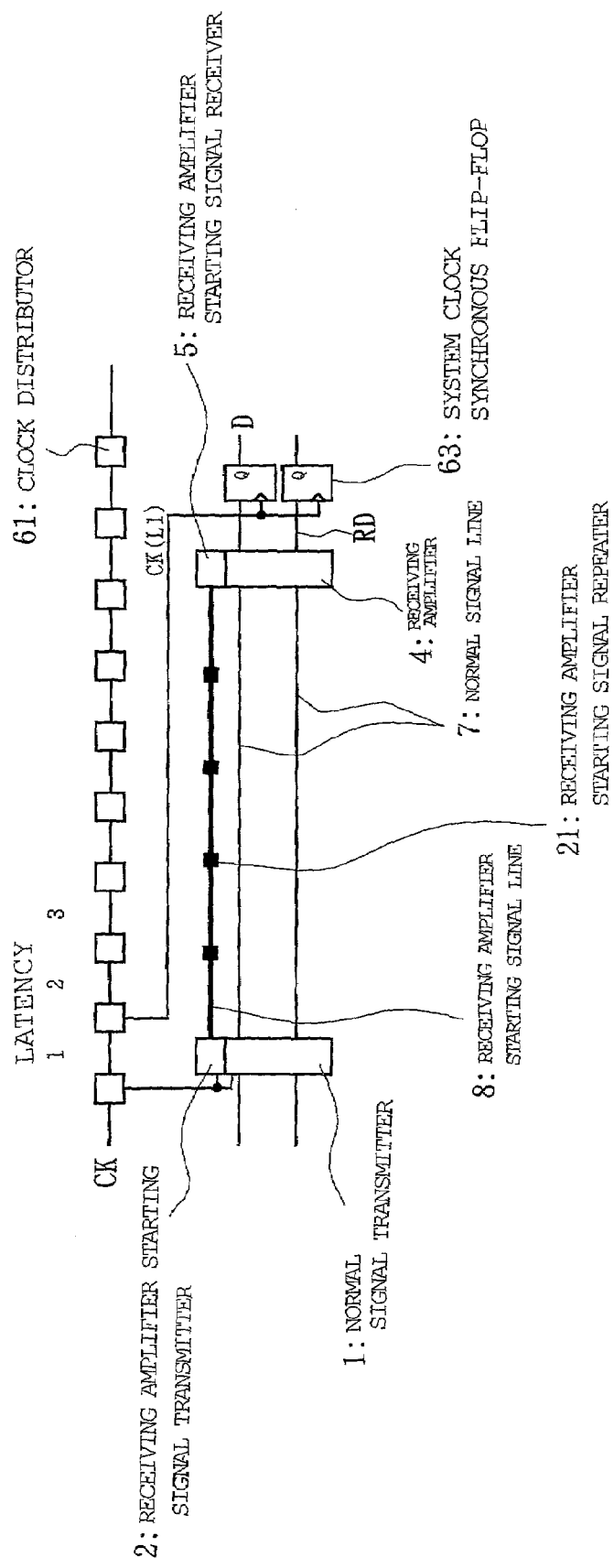
FIG. 31 is a block diagram showing a case where latency is set at 1 in the clock distribution system in yet another semiconductor device in one embodiment according to the present invention.
Figure 32:
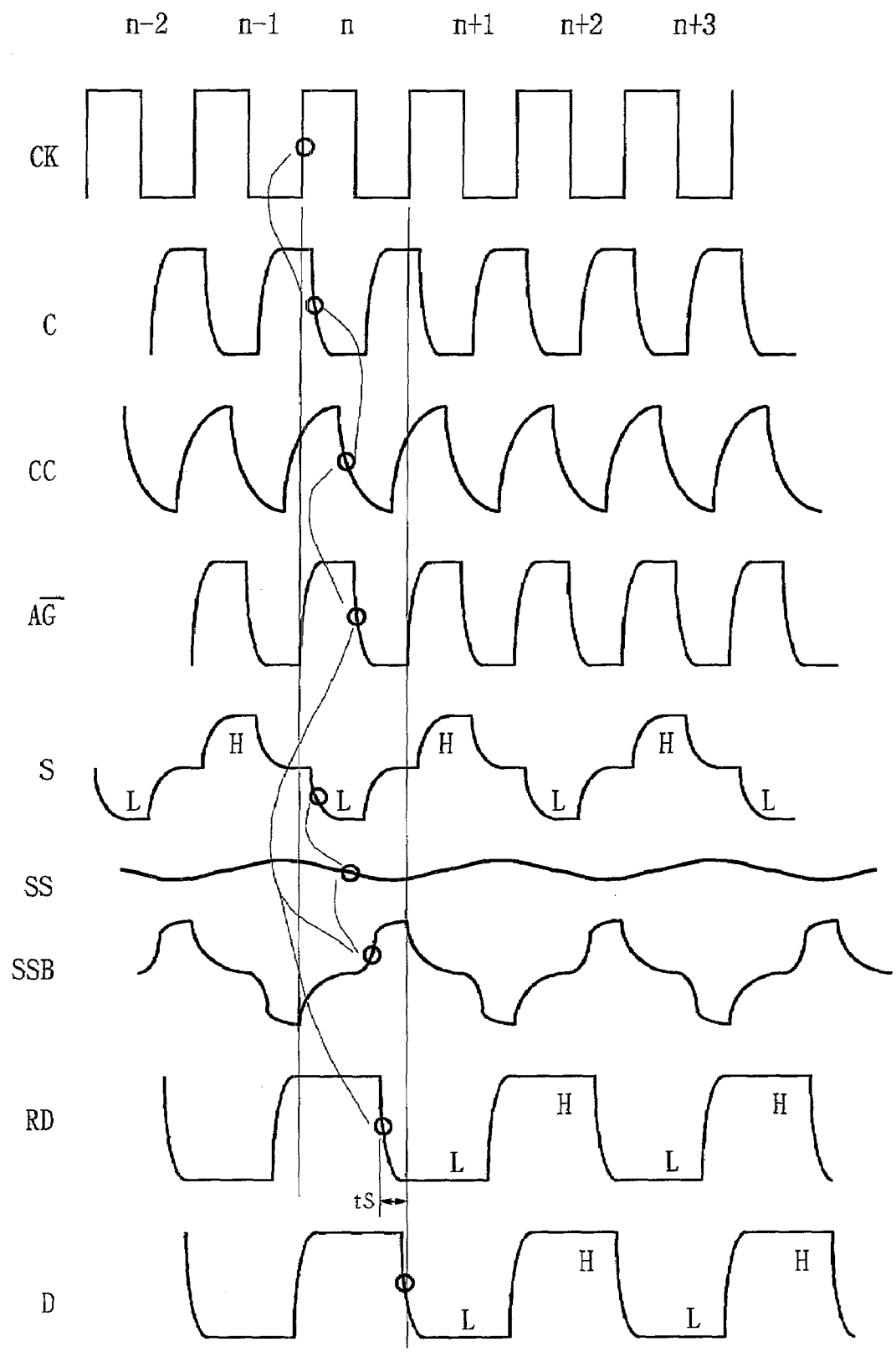
FIG. 32 is a waveform chart showing the operation of the clock distribution system shown in FIG. 31 in yet another semiconductor device in one embodiment according to the present invention.
Figures 33, 34:
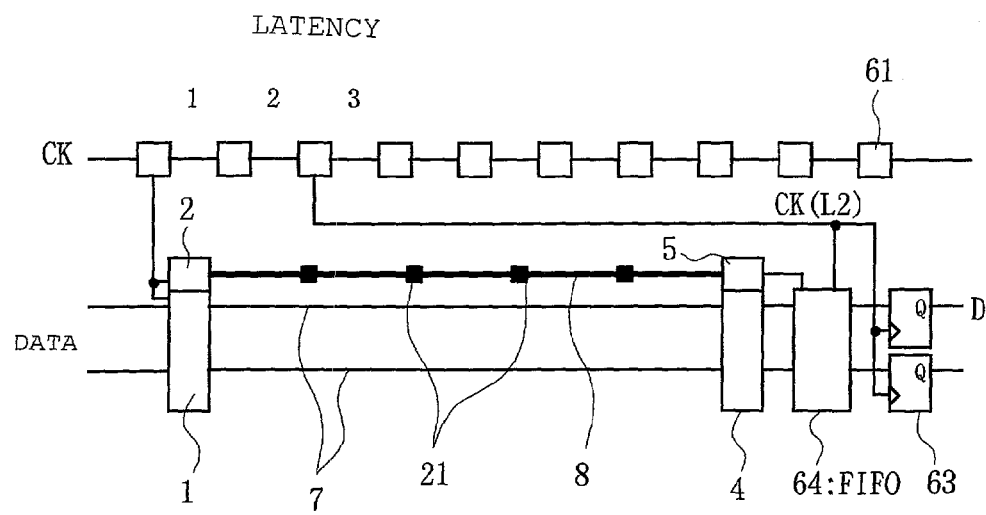
FIG. 33 is a block diagram showing a case where latency is set at 2 in the clock distribution system in yet another semiconductor device in one embodiment according to the present invention.
FIG. 34 is a circuit diagram showing a FIFO circuit in the clock distribution system in yet another semiconductor device in one embodiment according to the present invention.
Figure 35:
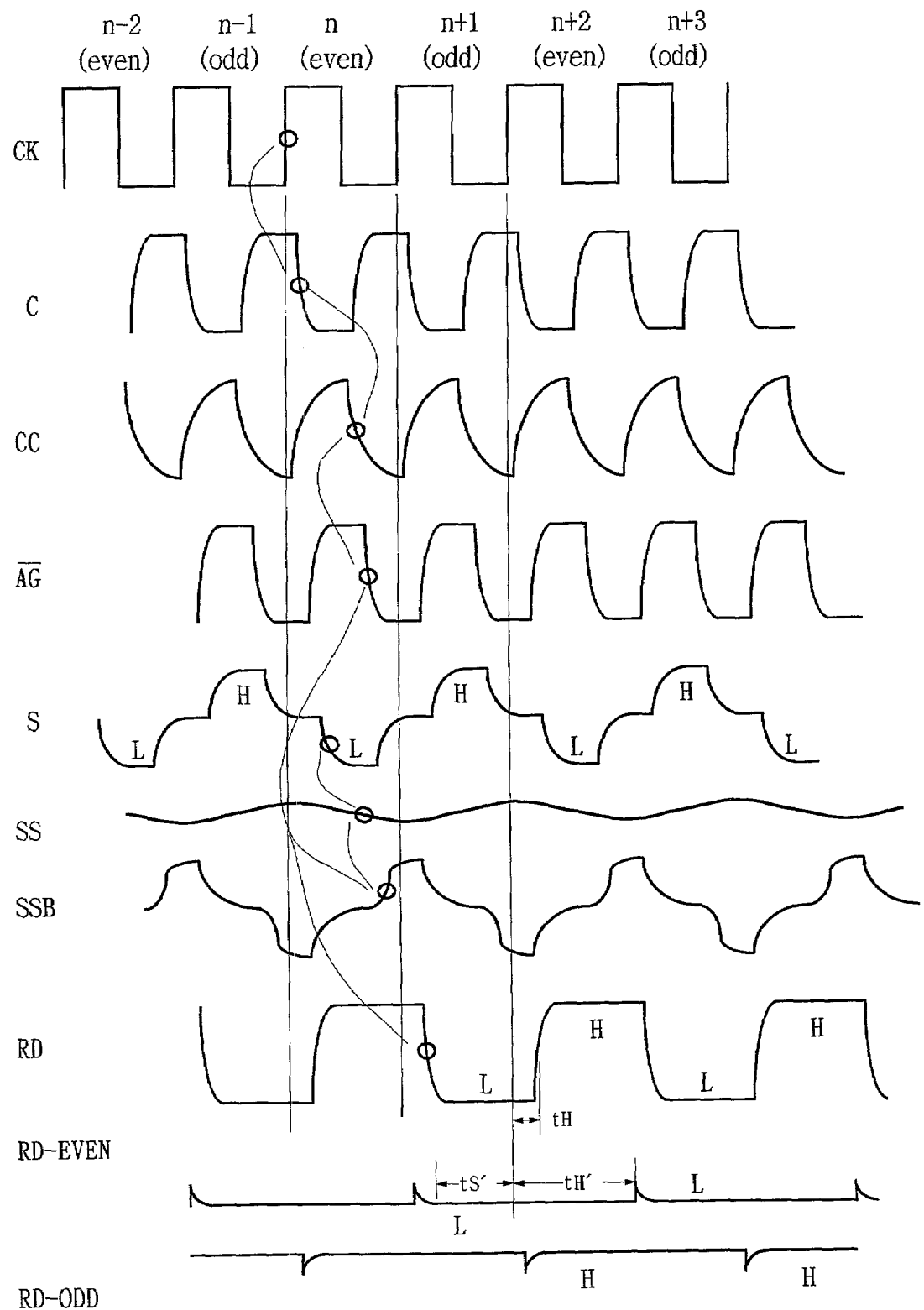
FIG. 35 is a waveform chart showing the operation of the clock distribution system shown in FIG. 34 in yet another semiconductor device in one embodiment according to the present invention.

Referring to FIGS. 29 to 35, one example of a clock distribution system in yet another semiconductor device in one embodiment according to the present invention will be described. FIG. 29 is a layout drawing showing a clock distribution system in yet another semiconductor device in one embodiment according to the present invention. FIG. 30 is an explanatory diagram showing a pipeline structure with latency set at 10. FIG. 31 is a block diagram showing a case where latency is set at 1. FIG. 32 is a waveform chart showing the operation of the clock distribution system shown in FIG. 31. FIG. 33 is a block diagram showing a case where latency is set at 2. FIG. 34 is a circuit diagram showing a FIFO circuit. FIG. 35 is a waveform chart showing the operation of the FIFO circuit.

FIG. 29 shows a typical CBIC clock distribution system. In this case, five paths are provided from a clock generator CG provided at the center of the clock distribution system to the farthest end. On a transfer path for transferring a system clock CK from this clock generator CG, clock distributors 61 are arranged at respective branch points. It is now assumed that data is transferred from a point A to a point B in FIG. 29. In this case, as an example of the simplest configuration, a pipeline structure including ten stages each consisting of the clock distributor 61 and flip-flops 62 as shown in FIG. 30. Namely, the latency between the two points is 10. In addition, latency from the point A to a point C is 6. As can be seen, the bus system is employed less frequently in a recent high rate logic LSI. According to the clock distribution method, optimal latency should be set for each data transfer path. Further, since the increase of the latency influences the performance of the device, much know-how and many man-hours are required to arrange circuit blocks in a chip in a design phase.

FIG. 31 shows an embodiment in which the present invention is used, compared with FIG. 29. Respective circuits shown in FIG. 31 are equal to those shown in FIG. 19. The receiving amplifier starting signal is transferred from the receiving amplifier starting signal transmitter 2 to the receiving amplifier starting signal receiver 5 through the receiving amplifier starting signal line 8 into which the repeaters 21 are inserted. The normal signal is transferred from the normal signal transmitter 1 to the receiving amplifier 4 through the normal signal lines 7. In addition, FIG. 32 shows operating waveforms according to the configuration of FIG. 31. The names of the respective circuits and terminals are the same as those shown in FIG. 19. The operation of the semiconductor device will be described briefly using the waveform chart.

The receiving amplifier starting signal is transmitted from the transmission end C to the receiving end CC of the receiving amplifier starting signal line 8 synchronously with the system clock CK. The receiving amplifier starting signal thus transmitted is subjected to waveform shaping by the receiving amplifier starting signal receiver 5, there by generating a signal AG/. On the other hand, transmission data is transmitted from the transmission end S of the normal signal transmitter 1 synchronously with the system clock CK. In this case, the data "1" and "0" are alternately transmitted. Data signals arriving at the receiving end SS of the normal signal line 7 are amplified by the receiving amplifier 4 (SSB). The receiving amplifier 4 is activated to sufficiently amplify the signals and the resultant signals are latched by the asynchronous flip-flop (RD) Here, the data definition timing of the receiving amplifier 4 is determined according to the delay propagation time of the receiving amplifier starting signal and is irrelevant to the timing of the system clock CK, i.e., asynchronous transfer is performed. To synchronize the signals again with the system clock CK on the receiving end SS of the normal signal line 7, the signals are fetched in the system clock synchronous flip-flop 63 using the timing of the system clock CK (L1). Thereafter, data D is outputted from this system clock synchronous flip-flop 63. It is noted that CK (L1) means a system clock having latency of 1 relative to the transmitter side.

In the embodiment of FIG. 31, for example, it is assumed that the entire length of the bus is about 20 mm and the cycle of the system clock CK is about 3 ns. If the cycle of the system clock CK is shorter or the receiving amplifier starting signal line 8 is longer, data setup time ts shown in FIG. 32 is shortened. Besides, there is a probability that stable setup time ts cannot be secured due to various irregularities. To prevent these, a method as shown in FIG. 33 to be described later is utilized.

FIG. 33 shows the case in which the latency between the asynchronous flip-flop of the receiving amplifier 4 and the system clock synchronous flip-flop 63 is set at 2 so as to lengthen the data setup time ts. However, only by lengthening the latency, data hold time tH is shortened as shown in FIG. 35. As a method of synchronizing the asynchronous communication data with the synchronous system clock, a FIFO (First In First Out) method is generally utilized. Since the latency is set at 2 in the embodiment of FIG. 33, the necessary bit capacity of a FIFO circuit 64 connected between the receiving amplifier 4 and the system clock synchronous flip-flop 63 is 2 bits.

FIG. 34 shows an example of the FIFO circuit 64. FIG. 35 shows operating waveforms when the FIFO circuit 64 is used. In FIG. 34, the FIFO circuit 64 includes two flip-flops 65 and 65 which serve as registers, a flip-flop 67 which fetches the starting signal AG/, a flip-flop 68 which fetches the system clock CK (L2), an AND gate, an OR gate and the like. This FIFO circuit 64 alternately stores data in the two flip-flops 65 and 66 from the receiving amplifier 4 synchronously with the flip-flop 67 which operates in accordance with the starting signal AG/. This appears as if the two flip-flops 65 and 66 are used for an even cycle and an odd cycle, respectively. Therefore, the outputs of the respective flip-flops 65 and 66 are denoted by RD-EVEN and RD-ODD for the sake of convenience. The system clock synchronous flip-flop 63 alternately fetches the RD-EVEN and RD-ODD outputs through the flip-flop 68, the AND gate, and the OR gate in accordance with the system clock CK (L2) having latency of 2. Although the latency is set at 2 in this example, latency may be set at not less than 3. In that case, the data setup time ts and the data hold time tH are lengthened. However, the bit capacity of the FIFO circuit 64 increases proportionally to the length of the latency.

Consequently, typical advantages attained by the embodiments of the present invention are as follows:

(1) The transfer rate of the normal signal line 7, such as a data bus, for transferring a signal having a high load capacitance can be increased.

(2) By using one signal line as the normal signal line 7 without using complementary lines, it is possible to suppress the increase of the layout area. In other words, it is possible to decrease the number of signal lines and to decrease the layout area.

(3) As the normal signal transmitter 1 on the data transmission side, a driver using three levels is employed. A chopper comparator is employed as the receiving amplifier 4 on the data receiving side. The transmission side transmits the receiving amplifier starting signal to the receiving amplifier starting signal receiver 5 using the receiving amplifier starting signal line 8 simultaneously with the transmission of data and data transmission and receiving timings are matched. It is thereby possible to ensure stable high rate data transfer.

(4) Since the data line used is a single line despite small-amplitude data transfer, it is possible to realize the high rate operation, the reduction of a chip size, and cost reduction.

(5) It is possible to realize high rate electrical characteristic with fewer contact points in the connection between the SOC chips.

(6) Although the bus method has been quite excellent for connecting a plurality of functional circuits, the increase of the propagation time of the long bus wiring causes problems with the acceleration of the LSI. Although this bus method has been replaced by the pipeline method, design flexibility has deteriorated, accordingly. Nevertheless, by using the high rate bus transfer method in the embodiments of the present invention, it is possible to design a high rate LSI while maintaining the flexibility of the bus.

The invention made by the inventor has been concretely described so far based on the embodiments thereof. Needless to say, the present invention is not be limited to these embodiments and various changes and modifications can be made within the scope of the invention.

For example, the normal signal line is mainly adapted to the data bus in the embodiments. However, the normal signal line is not limited thereto. It is possible to apply the normal signal line to any wiring having a relative high load capacitance such as an address bus or an I/O line in an array. Besides, it is also possible to apply the normal signal line not only to a signal wiring in an LSI but to a wiring on a board.

Furthermore, the examples of applying the present invention to the semiconductor device have been described in the embodiments, however, it is also possible to apply the same technique to a system. In particular, the present invention can be widely, generally applied to a device or a system which includes a signal receiving circuit which extracts the direction of the voltage change of a transmission signal in accordance with a timing signal.

Advantages obtained by the typical inventions among those disclosed in the present application will be briefly described as follows:
(1) It is possible to realize stable high rate data transfer.
(2) It is possible to realize the reduction of the layout area.
(3) It is possible to realize the acceleration of the semiconductor or the system, the reduction of a chip size, and cost reduction according to the above (1) and (2).

What is claimed is:

1. A signal receiving circuit for receiving a transmission AC signal, comprising: a circuit for extracting a direction of a voltage change of said transmission AC signal which passes through a signal line with a load capacitance in accordance with a timing AC signal which simultaneously passes through a control signal line without said load capacitance.

2. The signal receiving circuit according to claim 1, wherein said signal receiving circuit is included in a semiconductor chip, and said semiconductor chip further includes a signal transmission circuit for outputting said transmission AC signal and said signal line for transmitting said transmission AC signal.

3. The signal receiving circuit according to claim 1, wherein said signal receiving circuit is included in a semiconductor chip, and said transmission AC signal is applied from an outside of said semiconductor chip.

4. A semiconductor device, comprising: a circuit for extracting a direction of a voltage change of a transmission AC signal transmitted in a single transmission path with a load capacitance in accordance with a timing AC signal which simultaneously passes through a control signal transmission path without said load capacitance.

5. A system, comprising:
a first circuit including a first terminal for outputting data and a second terminal for outputting a timing signal;
a second circuit including a third terminal connected to said first terminal, a fourth terminal connected to said second terminal, and a receiving circuit connected to said third terminal and said fourth terminal;
a first wiring connected between said first terminal and said third terminal; and
a second wiring connected between said second terminal and said fourth terminal,
wherein said receiving circuit comprises:
a capacitance having a first electrode and a second electrode connected to said third terminal; and
a circuit for fetching a voltage of said second electrode at predetermined change timing of said timing signal.

6. The system according to claim 5, wherein said first circuit is included in a first semiconductor chip, and said second circuit is included in a second semiconductor chip.

7. The system according to claim 5, wherein said first circuit and said second circuit are included in the same semiconductor chip.

8. The system according to claim 5, wherein said first wiring is a single transmission path.

9. The system according to claim 5, wherein said first circuit comprises: a circuit for changing an output level for a specific period in accordance with a level of said data; and a circuit for controlling said first wiring to allow said first wiring to function between a first potential and a second potential.

10. The system according to claim 5, wherein said receiving circuit is a chopper comparator.

11. The system according to claim 5, wherein a plurality of said first wirings are provided, and said second wiring is a single wiring common to said plurality of first wirings.

12. A system, comprising:
a transmission circuit including a first terminal for outputting data and a second terminal for outputting a control signal;
a third terminal connected to said first terminal and a fourth terminal connected to said second terminal;
a receiving circuit connected to said third terminal and said fourth terminal; a first wiring connected between said first terminal and said third terminal; and
a second wiring connected between said second terminal and said fourth terminal,
wherein said receiving circuit comprises:
a capacitance having a first electrode and a second electrode connected to said third terminal; and
a circuit for outputting a signal based on a voltage of said second electrode at predetermined timing of said control signal.

13. The system according to claim 12, wherein said transmission circuit is included in a first semiconductor chip, and said receiving circuit is included in a second semiconductor chip.

14. The system according to claim 12, wherein said transmission circuit and said receiving circuit are included in the same semiconductor chip.

15. The system according to claim 12, wherein said first wiring is a single transmission path.

16. The system according to claim 12, wherein said transmission circuit comprises: a circuit for changing an output level for a specific period in accordance with a level of said data; and a circuit for controlling said first wiring to allow said first wiring to function between a first potential and a second potential.

17. The system according to claim 12, wherein said receiving circuit is a chopper comparator.

18. The system according to claim 12, wherein a plurality of said first wirings are provided, and said second wiring is a single wiring common to said plurality of first wirings.

19. A semiconductor device, comprising:
a transmission circuit including a first terminal for outputting data and a second terminal for outputting a control signal;
a third terminal connected to said first terminal and a fourth terminal connected to said second terminal; a receiving circuit connected to said third terminal and said fourth terminal;
a first wiring connected between said first terminal and said third terminal; and
a second wiring connected between said second terminal and said fourth terminal,
wherein said receiving circuit comprises:
a capacitance having a first electrode and a second electrode connected to said third terminal; and
a circuit for outputting a signal based on a voltage of said second electrode at predetermined timing of said control signal.

20. The semiconductor device according to claim 19, wherein said first wiring is a single transmission path.

21. The semiconductor device according to claim 19, wherein said transmission circuit comprises: a circuit for changing an output level for a specific period in accordance with a level of said data; and a circuit for controlling said first wiring to allow said first wiring to function between a first potential and a second potential.

22. The semiconductor device according to claim 19, wherein said receiving circuit is a chopper comparator.

23. The semiconductor device according to claim 19, wherein a plurality of said first wirings are provided, and said second wiring is a single wiring common to said plurality of first wirings.

* * * * *